US012215871B2

(12) United States Patent
Jang et al.

(10) Patent No.: US 12,215,871 B2
(45) **Date of Patent: *Feb. 4, 2025**

(54) OVEN

(71) Applicant: Samsung Electronics Co., Ltd., Suwon-si (KR)

(72) Inventors: Hyeong Jin Jang, Seoul (KR); Sang-Jin Lee, Hwaseong-si (KR); Jung Hak Lee, Suwon-si (KR); Myoung Keun Kwon, Seoul (KR); Sang Jun Park, Yongin-si (KR); Eung Ryeol Seo, Suwon-si (KR); Han Jun Sung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1069 days.

This patent is subject to a terminal disclaimer.

(21) Appl. No.: 17/063,062

(22) Filed: Oct. 5, 2020

(65) Prior Publication Data

US 2021/0018182 A1 Jan. 21, 2021

Related U.S. Application Data

(63) Continuation of application No. 15/693,036, filed on Aug. 31, 2017, now Pat. No. 10,794,599.

(30) Foreign Application Priority Data

Sep. 1, 2016 (KR) ........................ 10-2016-0112778
Feb. 6, 2017 (KR) ........................ 10-2017-0016282

(51) Int. Cl.
*F24C 15/00* (2006.01)
*F24C 7/04* (2021.01)
(Continued)

(52) U.S. Cl.
CPC ............ *F24C 15/008* (2013.01); *F24C 7/046* (2013.01); *F24C 7/081* (2013.01); *F24C 7/085* (2013.01);
(Continued)

(58) Field of Classification Search
CPC . G03G 9/09708; F24C 15/006; F24C 15/008; F24C 15/322; F24C 7/046;
(Continued)

(56) References Cited

U.S. PATENT DOCUMENTS 2,387,734 A 10/1945 Barnsteiner
7,696,454 B2 4/2010 Nam et al.
(Continued)

FOREIGN PATENT DOCUMENTS

CN 101504158 A 8/2009
CN 102135452 A 7/2011
(Continued)

OTHER PUBLICATIONS

European Search Report dated Dec. 6, 2022, in European Application No. 20 206 148.7.
(Continued)

*Primary Examiner* — Nathaniel E Wiehe
*Assistant Examiner* — Ket D Dang
(74) *Attorney, Agent, or Firm* — STAAS & HALSEY LLP

(57) ABSTRACT

An oven includes a main body, a cooking compartment provided in the main body and having a front surface thereof is opened, the cooking compartment having an opening, a camera provided above the cooking compartment and configured to capture an inside of the cooking compartment through the opening, a camera cooling fan disposed above the camera and configured to cool the camera by suctioning external air, a first glass provided at the opening of the
(Continued)

cooking compartment so that the camera captures the inside of the cooking compartment and configured to block transmission of heat in the cooking compartment to the camera, and a second glass provided between the camera and the first glass and configured to additionally block the transmission of heat to the camera.

20 Claims, 20 Drawing Sheets

(51) Int. Cl.
*F24C 7/08* (2006.01)
*F24C 15/32* (2006.01)
*F27D 21/02* (2006.01)

(52) U.S. Cl.
CPC .......... *F24C 15/006* (2013.01); *F24C 15/322* (2013.01); *F27D 21/02* (2013.01); *F27D 2021/026* (2013.01)

(58) Field of Classification Search
CPC .... F24C 7/081; F24C 7/085; F27D 2021/026; F27D 21/02
USPC .......................................................... 219/391
See application file for complete search history.

(56) References Cited

U.S. PATENT DOCUMENTS

| | | | | |
|---|---|---|---|---|
| 9,022,017 | B2 | 5/2015 | Hyun et al. | |
| 9,494,322 | B2 | 11/2016 | Luckhardt et al. | |
| 9,933,166 | B2 | 4/2018 | Matarazzi et al. | |
| 2007/0131220 | A1 | 6/2007 | Kim et al. | |
| 2007/0246453 | A1 * | 10/2007 | Nam | F24C 7/082 219/413 |
| 2011/0002677 | A1 | 1/2011 | Cochran | |
| 2011/0123689 | A1 | 5/2011 | Luckhardt et al. | |
| 2012/0099761 | A1 | 4/2012 | Yoon et al. | |
| 2013/0174746 | A1 | 7/2013 | Bach | |
| 2014/0026762 | A1 | 1/2014 | Riefenstein | |
| 2014/0041530 | A1 | 2/2014 | Luckhardt et al. | |
| 2014/0048055 | A1 | 2/2014 | Ruther | |
| 2015/0056344 | A1 | 2/2015 | Luckhardt | |
| 2015/0107575 | A1 | 4/2015 | Plevacova | |
| 2015/0285512 | A1 | 10/2015 | Matarazzi et al. | |
| 2015/0330640 | A1 | 11/2015 | Wersborg | |

FOREIGN PATENT DOCUMENTS

| | | | | |
|---|---|---|---|---|
| CN | 103134090 A | | 6/2013 | |
| CN | 104287640 A | | 1/2015 | |
| DE | 102006011028 | | 9/2007 | |
| EP | 0 899 512 A1 | | 3/1999 | |
| EP | 1050718 A2 | * | 11/2000 | F24C 15/2007 |
| EP | 2331392 | | 12/2009 | |
| EP | 2 363 648 A2 | | 9/2011 | |
| EP | 2 363 648 A3 | | 2/2012 | |
| EP | 2 520 169 A1 | | 11/2012 | |
| EP | 2741013 | | 6/2014 | |
| JP | 2000-314530 A | | 11/2000 | |
| JP | 2003-056852 | | 2/2003 | |
| JP | 2016-080210 | | 5/2016 | |
| JP | 2018-534514 A | | 11/2018 | |
| KR | 10-2005-0050229 | | 5/2005 | |
| KR | 10-2006-0088747 | | 8/2006 | |
| KR | 10-2007-0062808 A | | 6/2007 | |
| KR | 10-2007-0103871 | | 10/2007 | |
| KR | 10-2010-0087627 | | 8/2010 | |
| KR | 10-2010-0134430 | | 12/2010 | |
| KR | 10-2011-0099541 | | 9/2011 | |
| KR | 10-2016-056405 | | 5/2016 | |
| WO | WO 2012/070257 | | 5/2012 | |
| WO | 2015/185211 A2 | | 12/2015 | |

OTHER PUBLICATIONS

Extended European Search Report dated Jan. 26, 2018 in corresponding European Patent Application No. 17188971.0, 10 pgs.
International Search Report dated Dec. 20, 2017 in corresponding International Patent Application No. PCT/KR2017/009485, 3 pgs.
Office Action mailed Sep. 16, 2019 in European Patent Application No. 17188971.0, 6 pgs.
US Office Action dated Jan. 28, 2020 in U.S. Appl. No. 15/693,036.
US Notice of Allowance dated Jun. 2, 2020 in U.S. Appl. No. 15/693,036.
U.S. Appl. No. 15/693,036, filed Aug. 31, 2017, Hyeong Jin Jang, et al., Samsung Electronics Co., Ltd.
Office Action dated Feb. 15, 2024, in Korean Application No. 10-2017-0016282.
Office Action dated Nov. 28, 2023, in India Application No. 201917012378.
Office Action dated Aug. 8, 2023, in Korean Application No. 10-2017-0016282.
Chinese Office Action dated Aug. 6, 2021 issued in Chinese Application No. 201710787367.5.
Indian Office Action dated Mar. 1, 2021 in Indian Patent Application No. 201917012378.
Extended European Search Report dated Feb. 3, 2021 in European Patent Application No. 20206148.7.
Office Action dated Oct. 16, 2024, in European Application No. 20 206 148.7.

* cited by examiner

OVEN

CROSS-REFERENCE TO RELATED APPLICATION

This application is a continuation application of U.S. patent application Ser. No. 15/693,036, filed on Aug. 31, 2017, which claims the benefit of Korean Patent Application Nos. 10-2016-0112778 and 10-2017-0016282, filed on Sep. 1, 2016 and Feb. 6, 2017, respectively in the Korean Intellectual Property Office, the disclosure of which is incorporated herein by reference.

BACKGROUND

1. Field

Embodiments of the present disclosure relate to an oven including a camera provided above a cooking compartment to capture an inside of the cooking compartment.

2. Description of the Related Art

Generally, an oven is a device for cooking foods and includes a cooking compartment, a heating device applying heat to the cooking compartment, and a circulation fan circulating the heat generated by the heating device in the cooking compartment.

The oven, which is a device for sealing, heating, and cooking an object to be cooked, may be generally classified into an electric-type oven, a gas-type oven, and an electronic-type oven depending on a heat source.

The electric oven uses an electric heater as a heat source, and a gas oven and a microwave range use friction heat of water molecules caused by heat and high frequency generated by gas as heat sources.

Generally, the oven includes a main body which forms an appearance thereof and an open front surface so that a food to be cooked is inserted into a cooking compartment, and a door installed at the front surface of the main body to selectively open or close the cooking compartment.

Recently, a cooking state of a food being cooked in a cooking compartment of an oven is monitored via an external camera, or the oven may be remotely controlled to be conveniently used by a user.

However, when the inside of the cooking compartment is captured by the external camera, phase diffuse reflection is generated due to a property of a glass mounted on a door of the oven, and thus the inside of the cooking compartment may not be clearly captured.

SUMMARY

Therefore, it is an aspect of the present disclosure to provide an oven which includes a camera disposed above a cooking compartment to clearly capture an inside of the cooking compartment and has a structure which cools the camera to prevent a temperature of the camera from being increased due to heat generated in the cooking compartment.

Additional aspects of the disclosure will be set forth in part in the description which follows and, in part, will be apparent from the description, or may be learned by practice of the disclosure.

In accordance with one aspect of the present disclosure, an oven includes a main body, a cooking compartment provided in the main body and having a front surface thereof is open, the cooking compartment having an opening, a camera provided above the cooking compartment and configured to capture an inside of the cooking compartment through the opening, a camera cooling fan disposed above the camera and configured to cool the camera by suctioning external air, a first glass provided at the opening of the cooking compartment so that the camera captures the inside of the cooking compartment and configured to block transmission of heat in the cooking compartment to the camera, and a second glass provided between the camera and the first glass and configured to additionally block the transmission of heat to the camera.

An inlet may be provided at an upper portion of the main body and be configured to suction the external air to cool the camera, and a rib may be provided around the inlet and configured to prevent water from passing through the inlet.

The main body may include an electrical component chamber provided above the cooking compartment and configured to accommodate electrical components, and the electrical component chamber may include an electrical component chamber cooling fan and configured to suction air into the electrical component chamber to cool an inside of the electrical component chamber and then discharge the air suctioned into the electrical component chamber to an outside of the electrical component chamber, and an exhaust duct and configured to guide the air suctioned into the electrical component chamber discharged to the outside of the electrical component chamber.

A fan holder on which the camera cooling fan is mounted may be provided in the electrical component chamber, and the fan holder may include a suction flow path communicating with the inlet to guide the external air to the camera.

The camera holder on which the camera is mounted may be provided under the fan holder, and the camera holder may include a mounting part on which the camera cooling fan is mounted, an outlet through which the air suctioned into the suction flow path is discharged, and a coupler coupled the camera holder to the exhaust duct.

The camera may include a mounting part on which the camera holder is mounted, a body tube extending downward from the mounting part and having a cylindrical shape, and a lens disposed at an end of the body tube to capture the inside of the cooking compartment.

A blocking member configured to block a part of the exhaust duct may be provided between the camera and the electrical component chamber cooling fan to prevent air discharged into the exhaust duct from contacting with the camera.

The blocking member may support the exhaust duct to prevent sagging of the exhaust duct.

The blocking member may be provided to be integrated with the camera holder.

A plurality of second glasses may be provided, and a glass holder may be provided at a lower portion of the camera so that the plurality of second glasses may be fixed to the glass holder.

The blocking member may be provided to be integrated with the glass holder.

The glass holder may include a plurality of glass fixers to which the plurality of second glasses are fixed, and a sealer having an insertion hole into which the end of the body tube at which the lens is disposed is inserted, and a space into which the end of the body tube is inserted is sealed by the sealer and the second glasses.

The glass holder may include a plurality of glass fixers to which the plurality of second glasses are fixed, an opening configured to be open to accommodate the end of the body tube, and a gasket attachable to or detachable from the opening and having an insertion hole into which the end of the body tube at which the lens is disposed is inserted, and a space into which the end of the body tube is inserted is sealed by the gasket and the second glasses.

The opening is provided on a ceiling of the cooking compartment, and a glass bracket at which the first glass is mounted may be attachable to or detachable from the opening.

The air suctioned from the outside by the camera cooling fan cools the camera and is then discharged to the outside of the electrical component chamber through the outlet along with the air discharged into the exhaust duct.

In accordance with another aspect of the present disclosure, an oven includes a main body, a cooking compartment provided in the main body and having a front surface thereof is opened, the cooking compartment having an opening at a ceiling thereof, an electrical component chamber provided above the cooking compartment and configured to accommodate electrical components, an electrical component chamber cooling fan provided in the electrical component chamber and configured to cool an inside of the electrical component chamber by suctioning external air, an exhaust duct configured to discharge the air suctioned into the electrical component chamber to the outside, and a camera module provided above the cooking compartment and configured to capture an inside of the cooking compartment through the opening at the ceiling, wherein the camera module includes a camera a camera configured to capture the inside of the cooking compartment through the opening at the ceiling, a camera cooling fan disposed above the camera and configured to cool the camera by suctioning the external air, a blocking member provided between the camera and the electrical component chamber cooling fan to block a part of the exhaust duct and configured to prevent the air discharged into the exhaust duct from contacting with the camera, and a plurality of glasses provided under the camera such that the camera captures the inside of the cooking compartment and configured to block transmission of heat in the cooking compartment to the camera.

The plurality of glasses may include a first glass provided at the opening at the ceiling of the cooking compartment so that the camera captures the inside of the cooking compartment and configured to block the transmission of the heat in the cooking compartment to the camera, and a second glass provided between the camera and the first glass to additionally block the transmission of heat to the camera.

The second glass may be provided with a plurality of glasses and fixed to a glass holder, the glass holder may include a glass fixer to which the second glasses are fixed and a sealer having an insertion hole into which an end of the camera is inserted, and a space into which one end of the camera is inserted may be sealed by the second glass and the sealer.

An inlet may be provided at an upper portion of the main body so that air suctioned into the inlet cools the camera and is discharged to an outside of the electrical component chamber along with air discharged into the exhaust duct.

In accordance with another aspect of the present disclosure, an oven includes a main body, a cooking compartment provided in the main body and having a front surface thereof is opened, the cooking compartment having an opening at a ceiling thereof, an electrical component chamber provided above the cooking compartment and configured to accommodate electrical components, an electrical component chamber cooling fan provided in the electrical component chamber and configured to cool an inside of the electrical component chamber by suctioning external air, an exhaust duct configured to discharge the air suctioned into the electrical component chamber to the outside, a camera provided above the cooking compartment and configured to capture the inside of the cooking compartment through the opening at the ceiling, and a camera cooling fan disposed above the camera to cool the camera by suctioning the external air, wherein the air suctioned by the camera cooling fan cools the camera and is discharged to an outside of the electrical component chamber along with air discharged into the exhaust duct.

A blocking member to prevent the camera from contacting with the air discharged into the exhaust duct may be provided between the camera and the electrical component chamber cooling fan such that the air discharged into the exhaust duct bypasses the camera and is discharged.

The camera may be mounted on a camera holder, and air that cooled the camera may be discharged through an outlet of the camera holder communicating with the exhaust duct.

The electrical component chamber cooling fan may be provided to have a larger size than a size of the camera cooling fan, and the air discharged into the exhaust duct by the electrical component chamber cooling fan may have a higher speed than a speed of the air discharged into the outlet.

The air discharged into the outlet may be discharged to the outside of the electrical component chamber through the exhaust duct along with the discharged air while being bypassed by the blocking member.

In accordance with one aspect of the present disclosure, an oven includes a main body including an inlet configured to suction external air, a cooking compartment provided in the main body and having a front surface thereof is open, the cooking compartment having an opening at a ceiling thereof, a camera provided above the cooking compartment and configured to capture an inside of the cooking compartment through the opening at the ceiling, an electrical component chamber provided above the cooking compartment to accommodate electrical components, an electrical component chamber cooling fan provided in the electrical component chamber to cool an inside of the electrical component chamber and the camera by suctioning the external air, and a suction duct including a suction flow path communicating with an inlet and an outlet through which the external air suctioned into the suction flow path and cooling the camera is discharged, wherein the outlet is provided to face the inlet of the electrical component chamber cooling fan.

An upper end of the outlet may be provided at a higher place than an upper end of the electrical component chamber cooling fan.

A camera holder on which the camera is mounted may be provided at a lower portion of the inlet, and the suction flow path and the outlet may communicate with the camera holder.

A partition wall may be provided between the suction flow path and the outlet so that the external air suctioned into the suction flow path cools the camera and is discharged into the outlet.

The electrical component chamber may include an exhaust duct configured to guide the external air suctioned by the electrical component chamber cooling fan to cool the electrical component chamber and the camera to be discharged to the outside of the electrical component chamber.

The camera may include a mounting part mounted on the camera holder, a body tube configured to extend downward from the mounting part, and a lens disposed at an end of the body tube and configured to capture the inside of the cooking compartment.

At least one glass may be provided under the camera and configured to allow the camera to capture the inside of the cooking compartment and block transmission of heat in the cooking compartment to the camera.

The glass may have a thickness of 4 mm or more.

The glass may include a first glass provided at a ceiling of the cooking compartment so that the camera captures the inside of the cooking compartment and configured to block the transmission of the heat in the cooking compartment to the camera, and a second glass provided between the camera and the first glass and configured to additionally block the transmission of heat to the camera.

The glass including the first glass and the second glass may have a total thickness of 4 mm or more.

A heat reflection coating layer may be provided on one surface or both surfaces of the glass.

The glass may be a tempered glass or a borosilicate glass.

The first glass adjacent to the cooking compartment among the first and second glasses may be a tempered glass or a borosilicate glass.

The ceiling of the cooking compartment may have an opening in which the first glass is installed, and the expression of "$f \geq g \times w/h$" may be satisfied when a width of the opening is f, a distance between the ceiling of the cooking compartment and the lens is g, a width of the cooking compartment is w, and a distance between the lens and the bottom surface of the cooking compartment is h.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
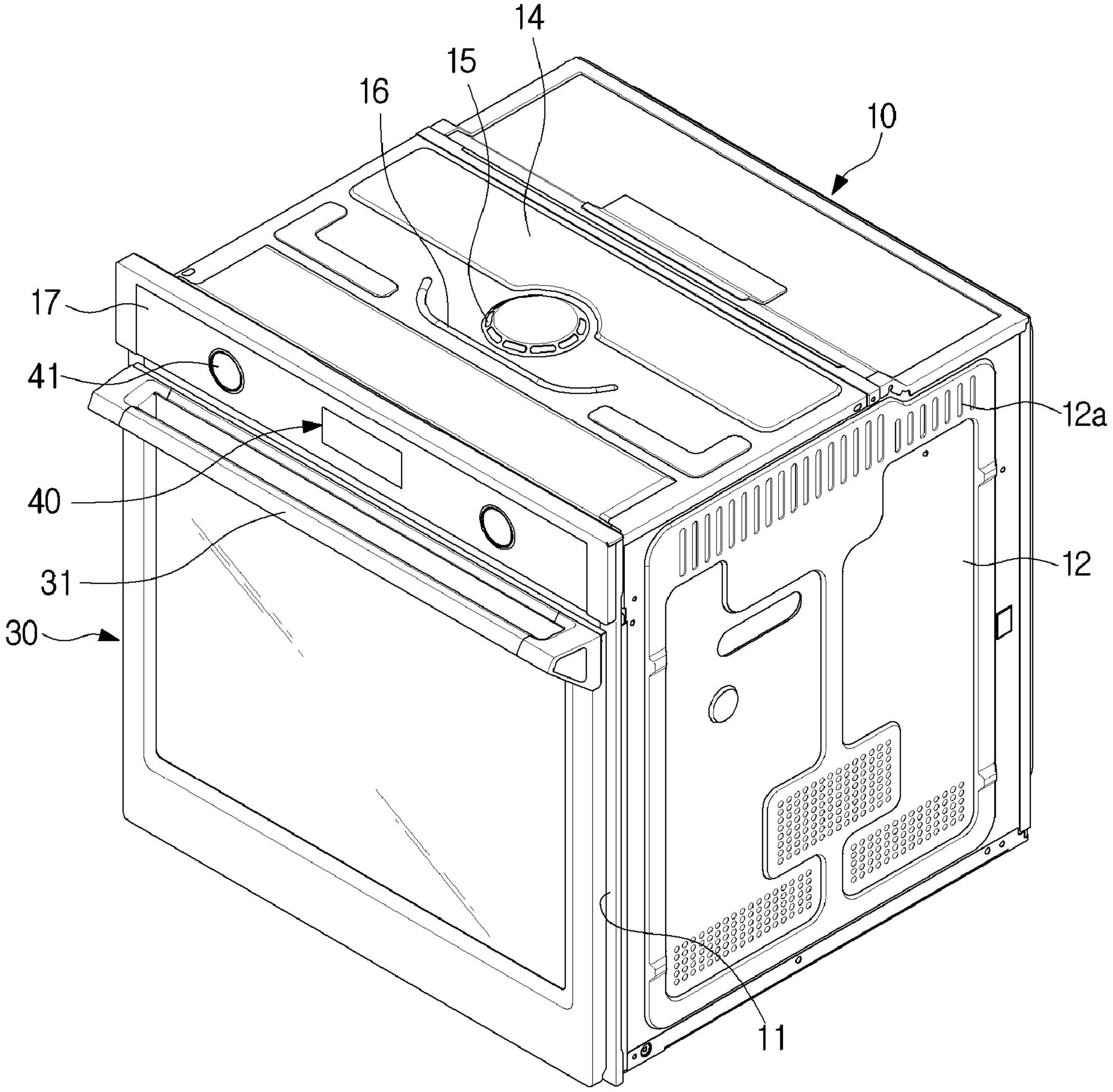
FIG. 1 is a perspective view of an oven in accordance with one embodiment of the present disclosure.

Embodiments described in this specification and configurations illustrated in drawings are only exemplary examples of the disclosed disclosure. It should be understood that the disclosure includes various modifications that may replace the embodiments and drawings at the time of filing of this application.

Like reference numerals of each drawing of the specification denote substantially similar components or elements.

Also, the terms used in the following description are intended to merely describe specific embodiments and are not intended to limit and/or restrict the disclosed disclosure. An expression used in the singular encompasses the expression of the plural. In the present specification, it should be understood that terms such as "including," "having," and "comprising" are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or be added.

It should be understood that, although the terms "first," "second," etc. used in the specification may be used herein to describe various elements, these elements are not limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terms used in the following description, such as "front end, "rear end, "top" "bottom," "upper end," "lower end," etc. are defined on the basis of the drawings, and a shape and position of each component is not limited by the terms.

Hereinafter, exemplary embodiments of the present disclosure will be described in detail with reference to the accompanying drawings.

Figure 2:
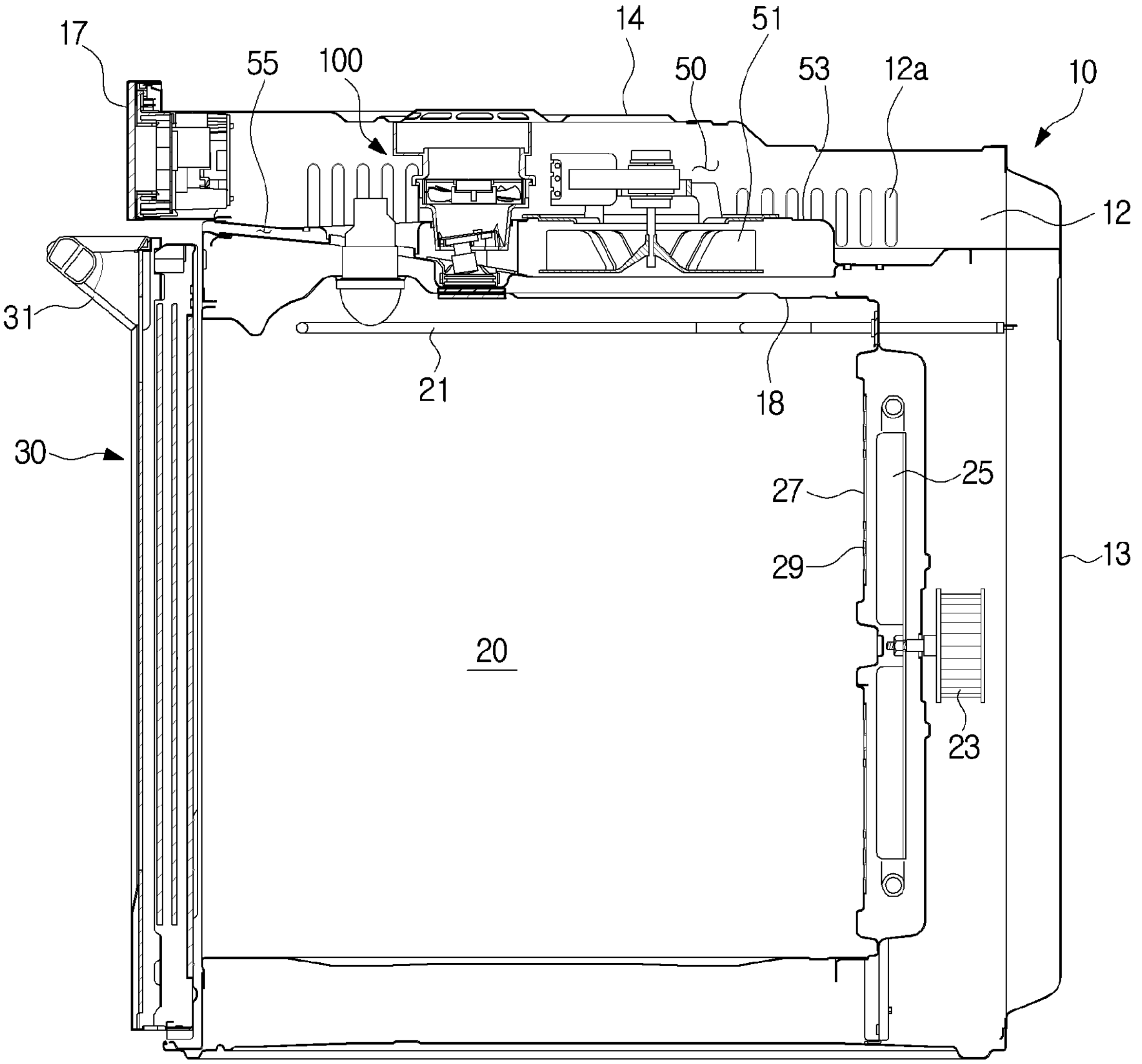
FIG. 2 is a side cross-sectional view of the oven in accordance with one embodiment of the present disclosure.
Figure 3:
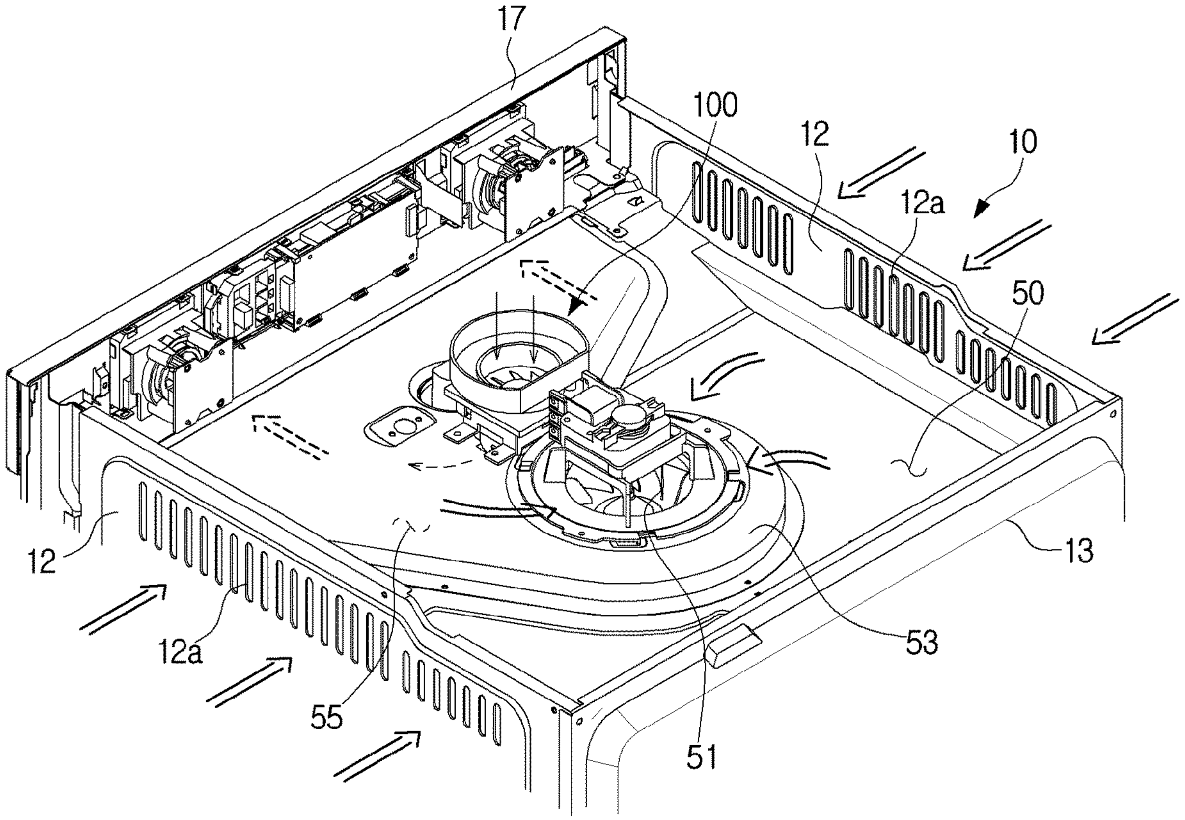
FIG. 3 is a view showing an inside of an electrical component chamber of the oven in accordance with one embodiment of the present disclosure.

FIG. 1 is a perspective view of an oven in accordance with one embodiment of the present disclosure, FIG. 2 is a side cross-sectional view of the oven in accordance with one embodiment of the present disclosure, and FIG. 3 is a view showing an inside of an electrical component chamber of the oven in accordance with one embodiment of the present disclosure.

As shown in FIGS. 1 to 3, the oven includes a main body 10 forming an appearance thereof, a cooking compartment 20 provided in the main body 10 so that a front surface thereof is open, a door 30 provided at a front surface of the main body 10 to open or close the cooking compartment 20, and a camera module 100 provided above the cooking compartment 20 to capture an inside of the cooking compartment 20.

The main body 10 includes a front panel 11 forming the front surface of the main body 10, a side panel 12 forming a side surface of the main body 10, a rear panel 13 forming a rear surface of the main body 10, and an upper panel 14 forming an upper surface of the main body 10.

An electrical component chamber cover 17 covering a front surface of an electrical component chamber 50, which will be described below, may be provided at an upper portion of the front surface of the front panel 11, and a display module 40, which will be described below, may be mounted on the electrical component chamber cover 17.

A suction port 12*a* is provided in the side panel to suction air into the electrical component chamber 50, which will be described below, and external air suctioned into the electrical component chamber 50 through the suction port 12*a* cools electrical components while flowing in the electrical component chamber 50.

An inlet 15 is provided at the upper panel 14 to suction air into the camera module 100, and external air suctioned into the inlet 15 by a camera cooling fan 120 of the camera module 100 cools a camera 140, which will be described below.

A rib 16 may be provided around the inlet 15 of the upper panel 14 to prevent passage of water falling into the upper panel 14 through the inlet 15.

The drawings show that the rib 16 is provided only on a front surface of the inlet 15, but the position of the inlet 15 is not limited thereto.

The cooking compartment 20 is provided in the main body 10 to have a box shape with an open front surface such that an object to be cooked may move in and out of the cooking compartment 20 through the open front surface of the cooking compartment 20.

A first opening 18*b* is provided at a ceiling 18 of the cooking compartment 20 and is covered by a first glass 170, which will be described below, to seal the cooking compartment 20, and the first opening 18*b* allows the inside of the cooking compartment 20 to be captured by the camera 140 provided above the cooking compartment 20 (see FIG. 4).

A plurality of supports (not shown) may be provided on both sidewalls of the inside of the cooking compartment 20, and a rack (not shown) may be mounted on the supports so that the object to be cooked may be placed thereon.

A divider (not shown) may be detachably mounted in the cooking compartment 20 to divide the cooking compartment 20 into a plurality of spaces.

The spaces of the cooking compartment 20 divided by the divider may have the same size or different sizes, and the divider is made of an insulating material to insulate each of spaces of the cooking compartment 20.

Therefore, the plurality of divided spaces of the cooking compartment 20 may be used depending on a purpose of a user.

A heater 21 heating the object to be cooked is provided in the cooking compartment 20, and the heater 21 may be an electric heater including an electric resistor.

The heater 21 is not limited to the electric heater and may be a gas heater generating heat by combusting gas.

Therefore, the oven may include an electric oven and a gas oven.

A circulation fan 25 circulating air of the cooking compartment 20 to evenly heat a food to be cooked and a circulation motor 23 operating the circulation fan 25 may be provided at a rear side of the cooking compartment 20.

A fan cover 27 may be provided on a front surface of the circulation fan 25 to cover the circulation fan 25, and the fan cover 27 has a through hole 29 so that air may flow therethrough.

The front surface of the open cooking compartment 20 is opened or closed by the door 30, and the door 30 may be hinge-coupled to a lower portion of the main body 10 to rotate from the main body 10.

A door handle 31 to be gripped by a user is provided at the upper portion of the front surface of the door 30 to allow the user to grip the door handle 31 to open or close the cooking compartment 20.

The display module 40, which displays various types of operation information of the oven and allows the user to input an operation command, may be mounted at the electrical component chamber cover 17 provided at the upper portion of the front surface of the front panel 11, and an operator 41 may be provided at the electrical component chamber cover 17 to additionally operate the oven.

An electrical device (not shown) controlling operations of various components including the display module 40 may be accommodated in the electrical component chamber 50 provided in the oven.

The electrical component chamber 50 may be provided above the cooking compartment 20, and an insulating material (not shown) insulating the electrical component chamber 50 and the cooking compartment 20 may be provided between the electrical component chamber 50 and the cooking compartment 20 to prevent transmission of heat of the cooking compartment 20 to the electrical component chamber 50.

The insulating material may be provided to totally cover an outside of the cooking compartment 20 so that heat of the cooking compartment 20 is not transmitted to the outside of the oven and may be provided between the electrical component chamber 50 and the cooking compartment 20.

A temperature of an inside of the electrical component chamber 50 may increase due to heat of various electric devices, and thus the oven may include a cooling structure to cool the electrical component chamber 50 by circulating air around the electrical component chamber 50.

The cooling structure of the oven may include an electrical component chamber cooling fan 51 allowing air to flow and an exhaust duct 53 having an exhaust passage 55 through which air suctioned by the electrical component chamber cooling fan 51 is discharged in front of the oven.

The external air of the oven is suctioned into the electrical component chamber 50 through the suction port 12*a* formed at the side panel 12, and the air suctioned into the electrical component chamber 50 cools the electrical components while moving in the electrical component chamber 50 and then may be discharged to the front surface of the oven by being guided by the exhaust passage 55 of the exhaust duct 53.

Figure 4:
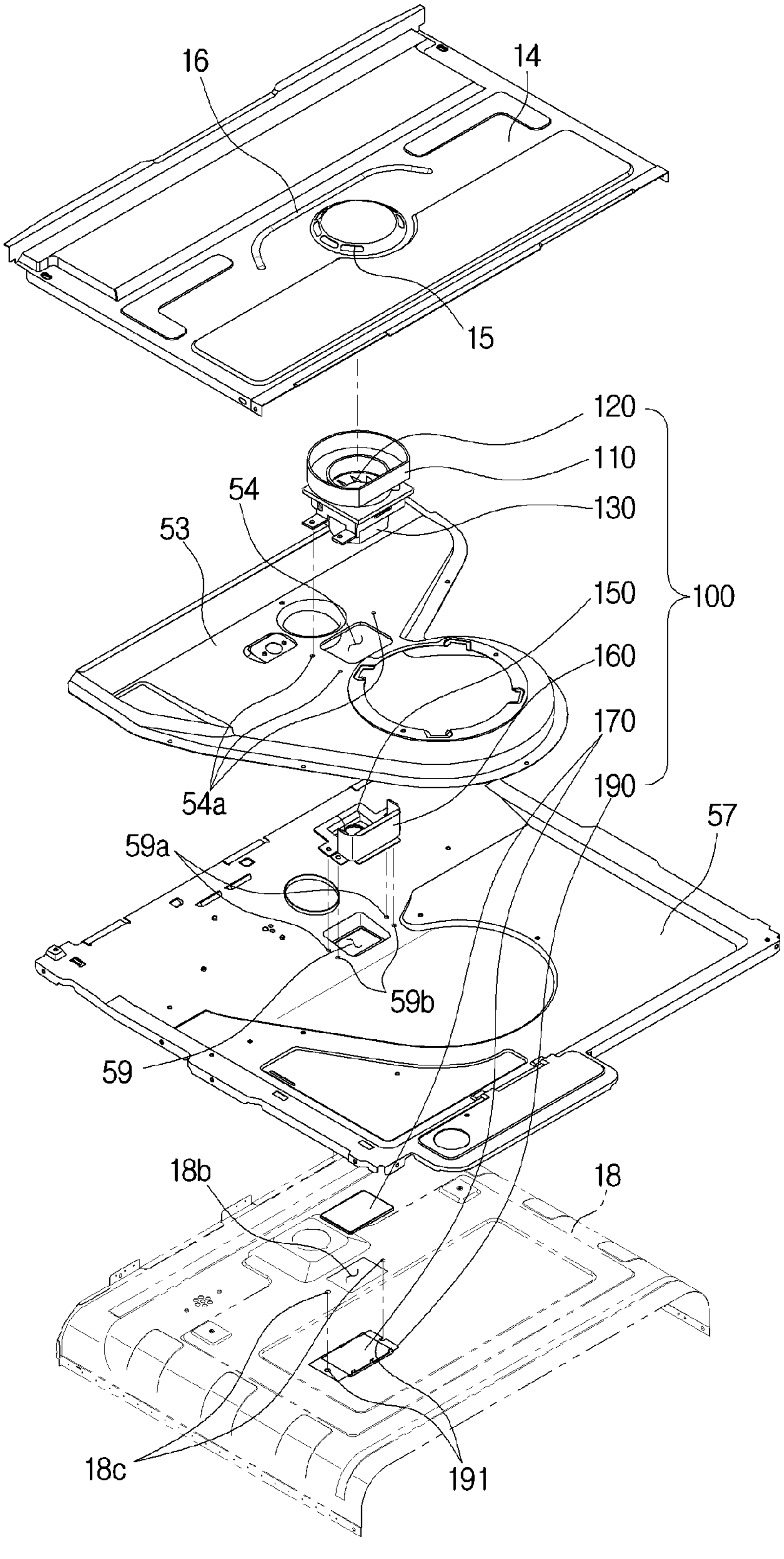
FIG. 4 is an exploded perspective view of a camera module in accordance with one embodiment of the present disclosure.

A second opening 54 and a third opening 59 are provided at the exhaust duct 53 and a bottom surface 57 of the electrical component chamber 50, respectively, and the second opening 54 may be provided at a position corresponding to the third opening 59, and thus the camera module 100 may be inserted into the second opening 54 and the third opening 59 (see FIG. 4).

Figure 5:
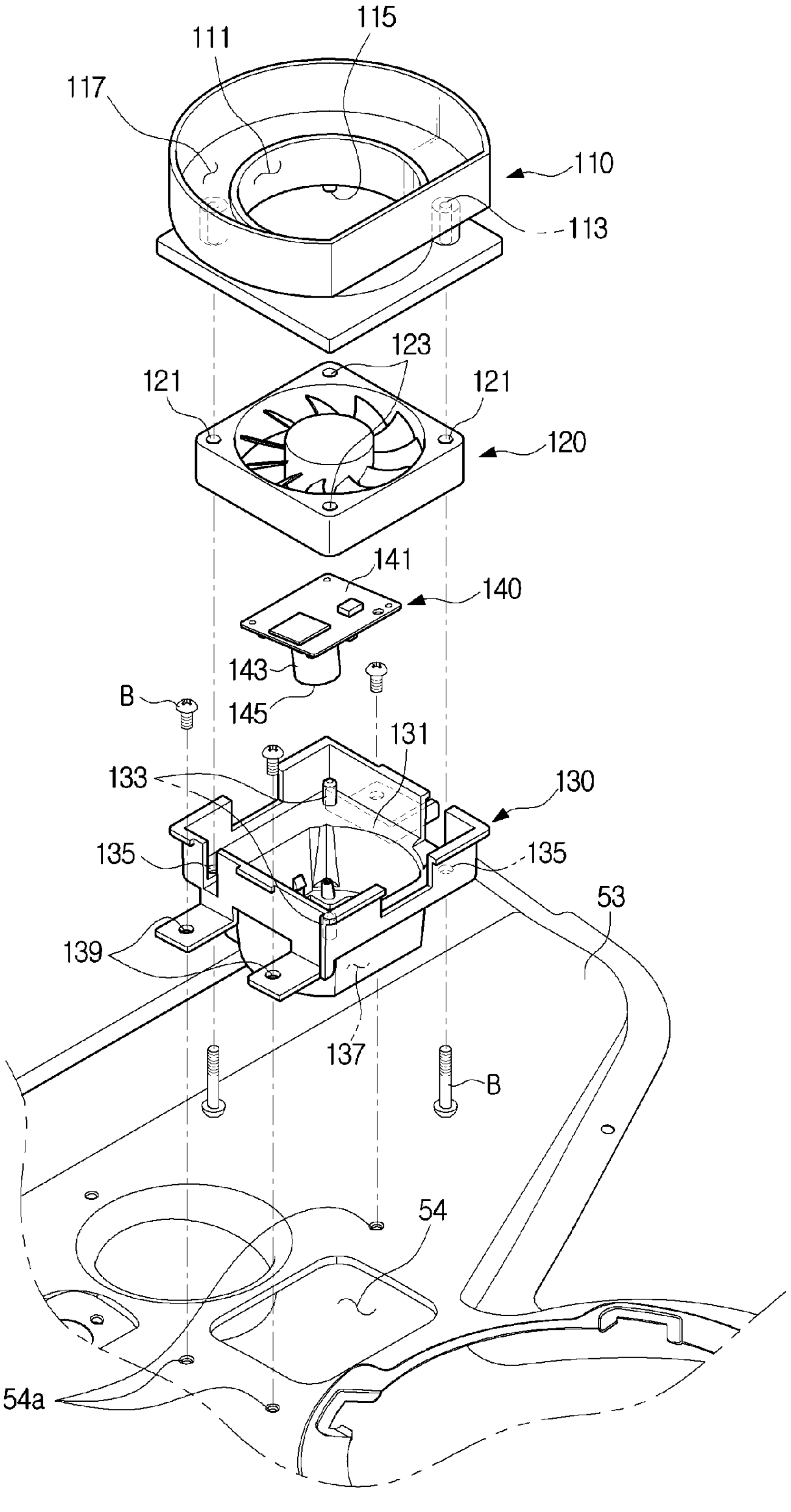
FIG. 5 is a view showing that a part of the camera module in accordance with one embodiment of the present disclosure is coupled to an exhaust duct.
Figure 6:
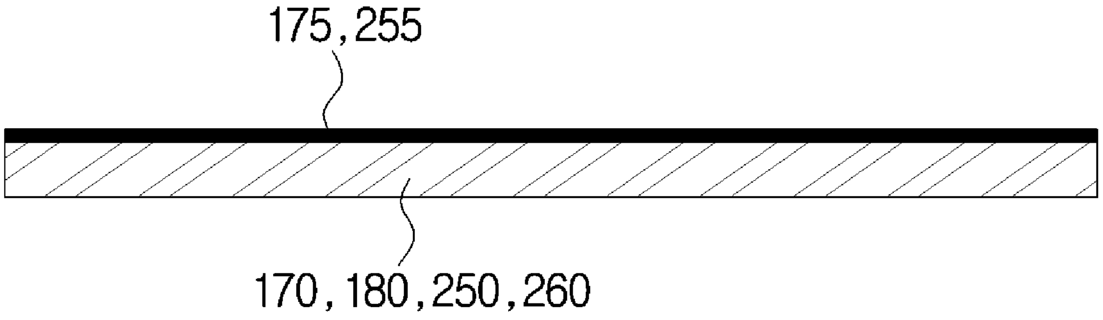
FIG. 6 is a view showing a heat reflection coating layer provided on one surface of a glass in accordance with one embodiment of the present disclosure.
Figure 7:
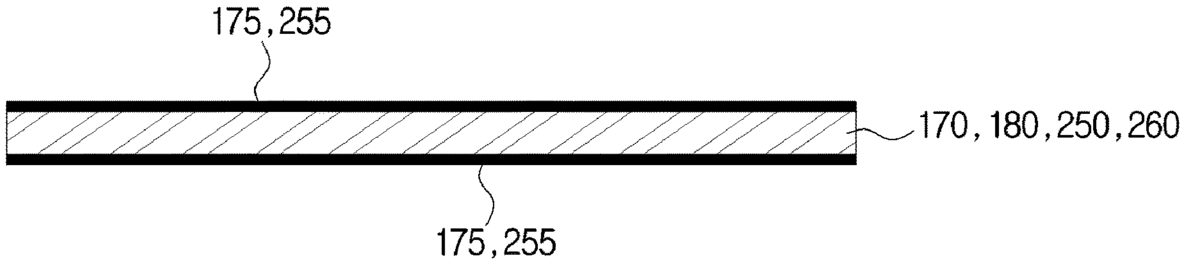
FIG. 7 is a view showing that heat reflection coating layers are provided on both surfaces of the glass in accordance with one embodiment of the present disclosure.
Figure 8:
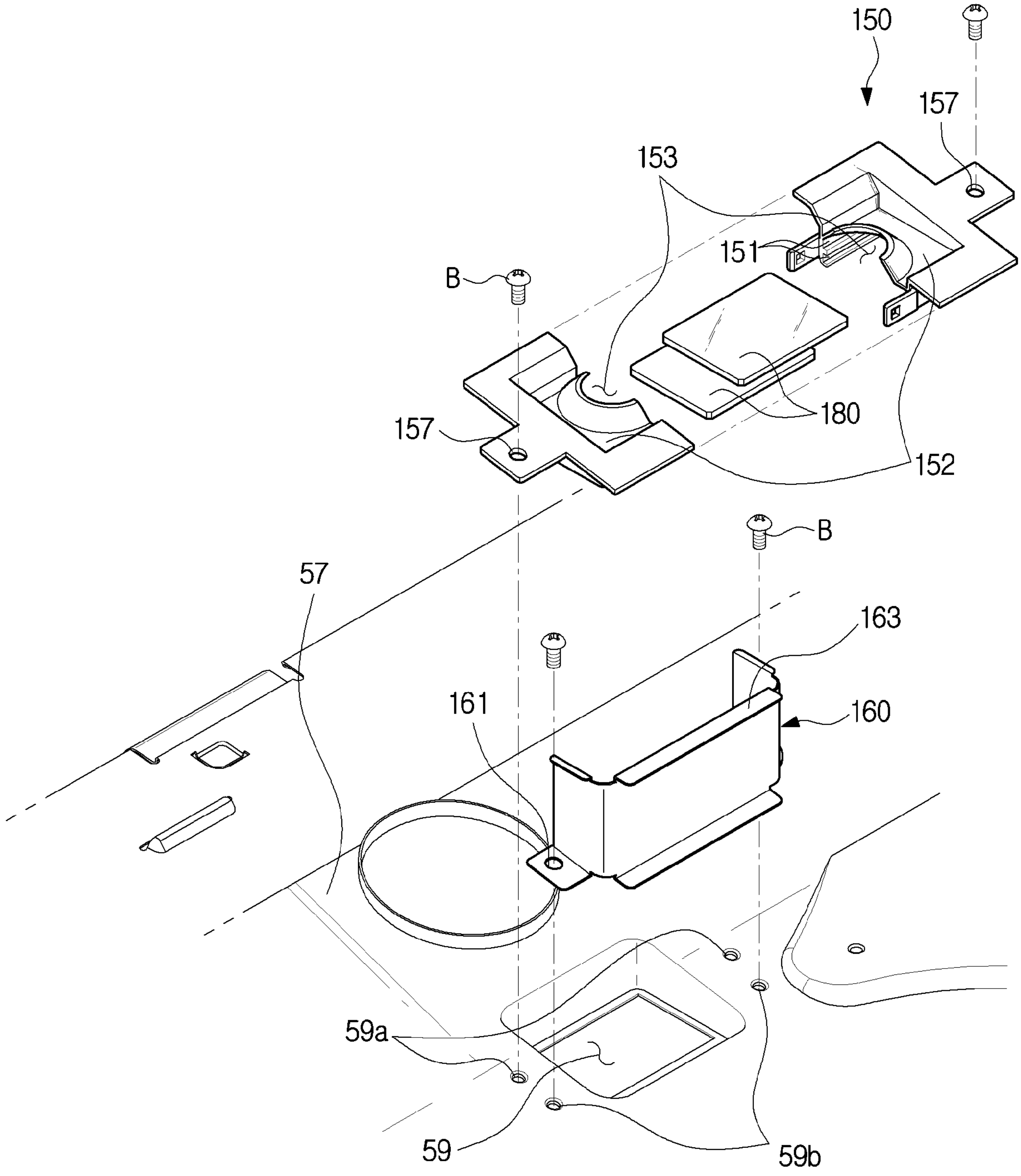
FIG. 8 is a view showing that a part of another camera module in accordance with one embodiment of the present disclosure is coupled to a bottom surface of the electrical component chamber.
Figure 9:
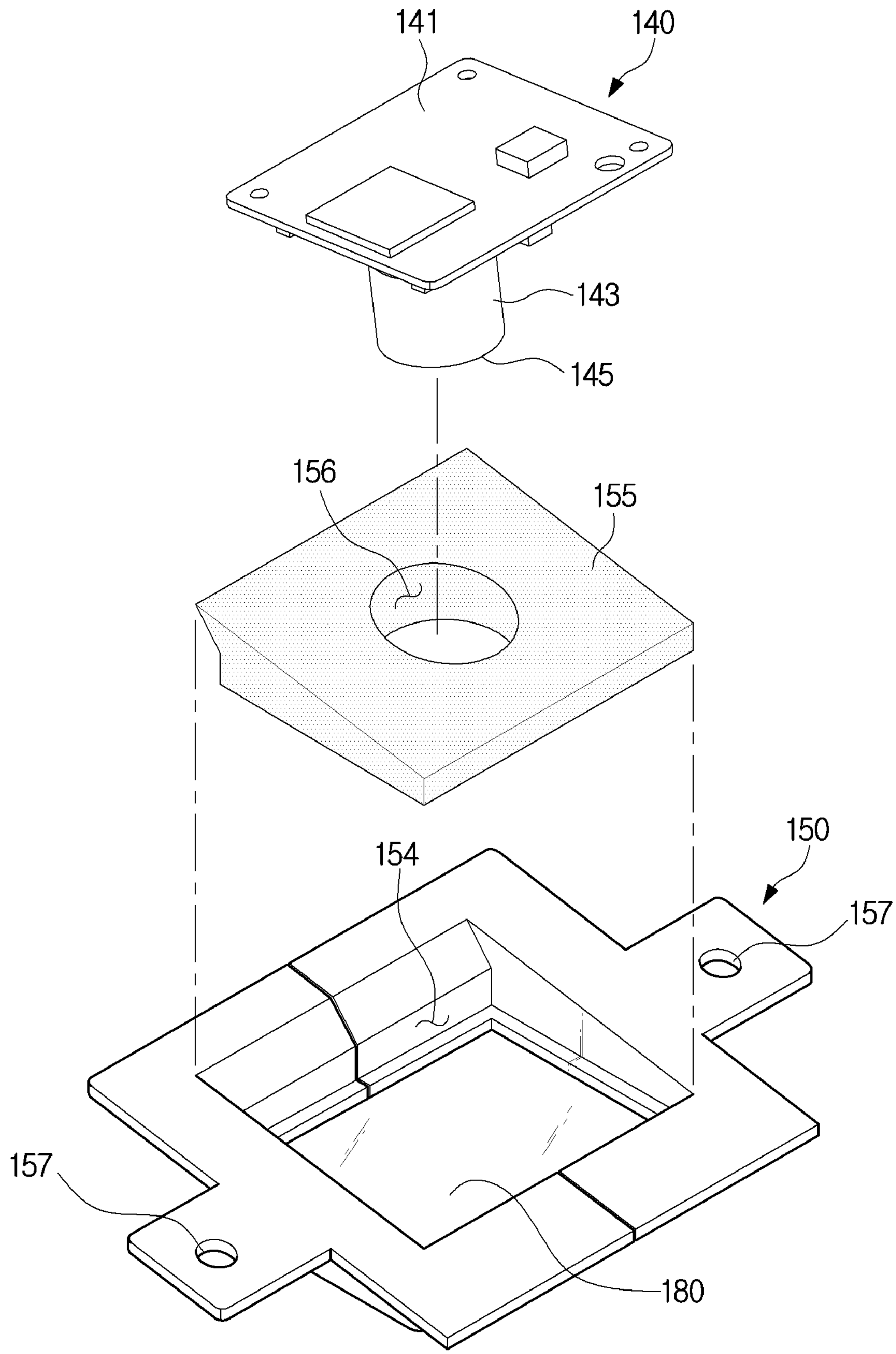
FIG. 9 is a view showing a glass holder in accordance with another embodiment of the present disclosure.

FIG. 4 is an exploded perspective view of a camera module in accordance with one embodiment of the present disclosure, FIG. 5 is a view showing that a part of the camera module in accordance with one embodiment of the present disclosure is coupled to an exhaust duct, FIG. 6 is a view showing a heat reflection coating layer provided on one surface of a glass in accordance with one embodiment of the present disclosure, FIG. 7 is a view showing that heat reflection coating layers are provided on both surfaces of the glass in accordance with one embodiment of the present disclosure, FIG. 8 is a view showing that a part of another camera module in accordance with one embodiment of the present disclosure is coupled to a bottom surface of the electrical component chamber, and FIG. 9 is a view showing a glass holder in accordance with another embodiment of the present disclosure.

As shown in FIGS. 4 to 8, the camera module 100 is provided above the cooking compartment 20 to capture a food to be cooked in the cooking compartment 20.

The camera module 100 includes a fan holder 110 communicating with the inlet 15 provided at the upper panel 14 of the main body 10, the camera cooling fan 120 mounted on the fan holder 110, a camera holder 130 on which the camera 140 is mounted, the camera 140 mounted on the camera holder 130 to capture the inside of the cooking compartment 20, and a plurality of glasses 170 and 180 provided under the camera 140.

The fan holder 110 is provided in the electrical component chamber 50 and includes a suction flow path 111 communicating with the inlet 15, a cooling fan coupling hole 113 to which the camera cooling fan 120 is coupled, a first fixing protrusion 115 fixing the camera cooling fan 120, and a water storage 117 storing dropped water when water drops through the inlet 15 to prevent transfer of the water to the camera 140 through the suction flow path 111.

The suction flow path 111 is provided at an upper portion of the fan holder 110 to communicate with the inlet 15 and guides the external air suctioned through the inlet 15 to the camera 140.

The cooling fan coupling hole 113 and the first fixing protrusion 115 are provided at a lower portion of the fan holder 110, and the first fixing protrusion 115 is inserted into a fixing hole 123 of the camera cooling fan 120, and the camera cooling fan 120 is fixed to the fan holder 110.

When the camera cooling fan 120 is fixed to the fan holder 110, the cooling fan coupling hole 113 of the fan holder 110 is positioned to correspond to a first coupling hole 121 of the camera cooling fan 120, and the camera cooling fan 120 is coupled to the fan holder 110 by a fastening member B inserted into the cooling fan coupling hole 113 and the first coupling hole 121.

The camera cooling fan 120 is coupled to the fan holder 110 so that external air is suctioned through the inlet 15, and the suctioned external air is transferred to the camera 140 to cool the camera 140.

The camera 140 is disposed in the electrical component chamber 50, and thus a temperature thereof may be increased by heat generated by the electrical components in the electrical component chamber 50. The electrical component chamber 50 in which the camera is disposed is provided above the cooking compartment 20, and thus the temperature thereof may be increased by heat generated in the cooking compartment 20.

When the temperature of the camera 140 increases, a malfunction may occur in the camera 140 and an image quality thereof may be degraded, and thus the camera cooling fan 120 for cooling the camera 140 may be provided at an upper portion of the camera 140.

The camera holder 130 on which the camera 140 is mounted is provided under the camera cooling fan 120.

The camera holder 130 includes a mounting part 131 on which the camera cooling fan 120 is mounted, an outlet 137 through which air suctioned into the suction flow path 111 of the fan holder 110 to cool the camera 140 is discharged, and a first coupler 139 coupled to the exhaust duct 53.

The camera cooling fan 120 mounted on the fan holder 110 is mounted on the mounting part 131, and the mounting part 131 includes a second fixing protrusion 133 inserted into the fixing hole 123 of the camera cooling fan 120, and a second coupling hole 135 provided at a position corresponding to the first coupling hole 121 of the camera cooling fan 120.

When the camera cooling fan 120 is mounted on the mounting part 131 so that the second fixing protrusion 133 of the mounting part 131 is inserted into the fixing hole 123 of the camera cooling fan 120, the cooling fan coupling hole 113 of the fan holder 110, the first coupling hole 121 of the camera cooling fan 120, and the second coupling hole 135 of the mounting part 131 are positioned to correspond to each other, and the fan holder 110, the camera cooling fan 120, and the camera holder 130 are coupled by the fastening member B.

The air suctioned into the suction flow path 111 of the fan holder 110 to cool the camera 140 is discharged through the outlet 137, and the air discharged into the outlet 137 is discharged to the outside along with air discharged by the exhaust duct 53.

The second opening 54 is provided in the exhaust duct 53, and a camera holder coupling hole 54*a* to which the camera holder 130 is coupled is provided around the second opening 54.

The camera holder 130 is coupled to the exhaust duct 53 by the fastening member B inserted into the camera holder coupling hole 54*a* and the first coupler 139, and a lower portion of the camera holder 130 coupled to the exhaust duct 53 is inserted into the second opening 54.

The camera 140 includes a mounting part 141 mounted on the camera holder 130, a body tube 143 extending downward from the mounting part 141 and having a cylindrical shape, and a lens 145 disposed at an end of the body tube 143 to capture the inside of the cooking compartment 20.

Because the lens 145 is positioned at the lower portion of the camera 140 mounted on the camera holder 130, the lens 145 is inserted into the second opening 54 along with the lower portion of the camera holder 130.

The lens 145 inserted into the second opening 54 is inserted into the third opening 59 provided at the bottom surface 57 of the electrical component chamber 50 to be positioned near the ceiling 18 of the cooking compartment 20 and capture the inside of the cooking compartment 20.

The glasses 170 and 180 including the plurality of first glasses 170 and second glasses 180 are provided at the lower portion of the camera 140, and two first glasses 170 are fixed to a glass bracket 190 to be disposed at an upper surface and a lower surface of the ceiling 18, and the plurality of second glasses 180 are fixed to a glass holder 150 disposed to be near the lower portion of the camera 140.

The drawings show the glasses 170 and 180 including the two first glasses 170 and two second glasses 180, but the numbers of glasses 170 and 180 is not limited thereto. Each of the first glasses 170 and the second glasses 180 may be provided as one or at least three glasses, and the glasses 170 and 180 may be provided as a single glass without being separated into the first glass 170 and the second glass 180.

When the glasses 170 and 180 are provided as one, it is preferable for the glasses 170 and 180 to be provided to have a thickness of 4 mm or more.

When the glasses 170 and 180 are separated into the first glass 170 and the second glass 180, it is preferable for a total thickness of the first glass 170 and the second glass 180 to be about 4 mm or more.

When the thickness of the glasses 170 and 180 is about 4 mm or more, a heat reflection coating layer 175 is provided on one surface of the glasses 170 and 180, as shown in FIG. 6, or heat reflection coating layers 175 may be provided on both sides of the glasses 170 and 180, as shown in FIG. 7.

When the heat reflection coating layer 175 is provided on one surface of the glasses 170 and 180, it is preferable for the surface on which the heat reflection coating layer 175 is provided to face the cooking compartment 20.

Also, the glasses 170 and 180 may be formed of a tempered glass which is heat resistant or a borosilicate glass to prevent damage caused by heat. When the plurality of glasses 170 and 180 are provided, only a glass 170 disposed closest to the cooking compartment 20 may be formed of the tempered glass or the borosilicate glass.

The glass holder 150 includes a glass fixer 151 to which the plurality of second glasses 180 are fixed, a sealer 152 with an insertion hole 153 into which an end of the body tube 143 of the camera 140 on which the lens 145 is disposed is inserted, and a second coupler 157 coupled to the bottom surface 57 of the electrical component chamber 50.

A space into which the end of the body tube 143 of the camera 140 in which the lens 145 is disposed is inserted is sealed by the second glass 180 positioned on top of the plurality of second glasses 180 and the sealer 152 to prevent a foreign material, such as dust, from entering the lens 145.

Because only the end of the body tube 143 of the camera 140 at which the lens 145 is disposed is inserted into the insertion hole 153, when a user looks at the camera 140 in the cooking compartment 20, a remaining portion of the camera 140 except for the lens 145 is not visible and exposure of an unnecessary portion is prevented.

The glass holder 150, as shown in FIG. 9, may be provided to include the glass fixer 151 to which the plurality of second glasses 180 are fixed, an opening 154 opened to accommodate the end of the body tube 143, and a gasket 155 detachably coupled to the opening 154 and having an insertion hole 156 into which the end of the body tube 143 is inserted.

In the case of the glass holder 150 shown in FIG. 9, a space into which the end of the body tube 143 of the camera 140 at which the lens 145 is disposed is inserted is sealed by the gasket 155 and the second glass 180 positioned at the top of the plurality of second glasses 180 to prevent a foreign material, such as dust, from entering the lens 145.

The third opening 59 is provided at the bottom surface 57 of the electrical component chamber 50 at a position corresponding to the second opening 54 provided in the exhaust duct 53, and a glass holder coupling hole 59*a* to which the glass holder 150 is coupled is provided around the third opening 59.

The glass holder 150 is coupled to the bottom surface 57 of the electrical component chamber 50 by the fastening member B inserted into the glass holder coupling hole 59*a* and the second coupler 157, and the lens 145 disposed on the glass holder 150 captures the inside of the cooking compartment 20 through the third opening 59 provided in the bottom surface 57 of the electrical component chamber 50 and the second glasses 180 fixed to the glass holder 150.

The first opening 18*b* provided on the ceiling 18 of the cooking compartment 20 is positioned to correspond to the second opening 54 provided on the exhaust duct 53 and the third opening 59 provided on the bottom surface 57 of the electrical component chamber 50, and a glass bracket coupling hole 18*c* coupled to the glass bracket 190 on which the first glass 170 is mounted is provided around the first opening 18*b*.

The glass bracket 190 includes a fourth coupler 191 positioned to correspond to the glass bracket coupling hole 18*c*, and the glass bracket 190 is coupled to the ceiling 18 of the cooking compartment 20 by the fastening member B inserted into the glass bracket coupling hole 18*c* and the fourth coupler 191.

Because the glass bracket 190 is attachable to or detachable from the ceiling 18 of the cooking compartment 20, when a foreign material is on the first glass 170 positioned above the cooking compartment 20, the glass bracket 190 may be separated from the ceiling 18 of the cooking compartment 20, and then the foreign material on the first glass 170 may be removed.

Figure 10:
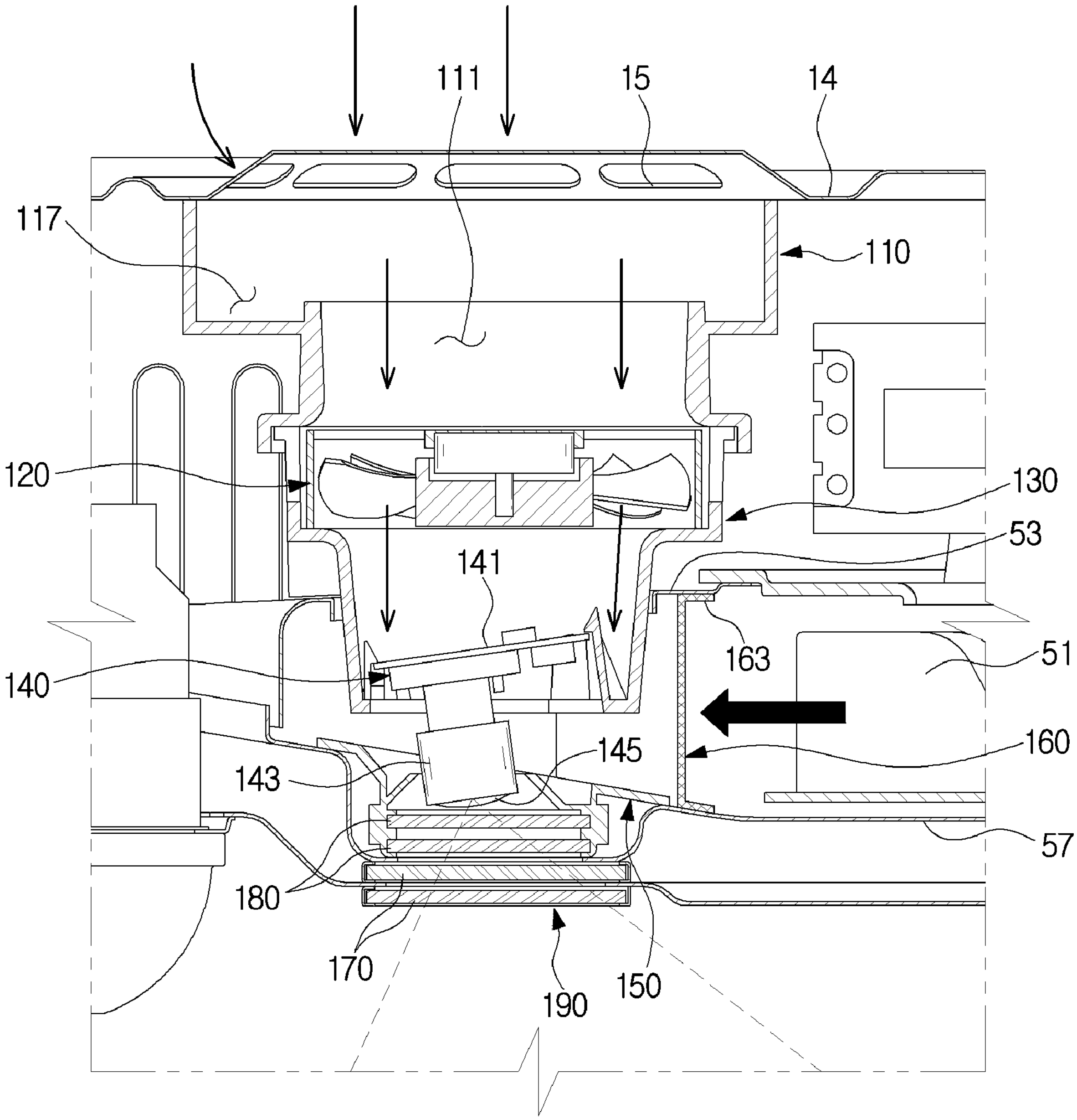
FIG. 10 is a view showing that a blocking member in accordance with one embodiment of the present disclosure is provided between the camera and a cooling fan of the electrical component chamber.

Therefore, the first glass 170 is positioned at the first opening 18*b* provided at the ceiling 18 of the cooking compartment 20, the second glass 180 is positioned at the third opening 59 provided at the bottom surface 57 of the electrical component chamber 50, and the lens 145 of the camera 140 may capture the inside of the cooking compartment 20 through the first glass 170 and the second glass 180 (see FIG. 10).

Also, transmission of heat in the cooking compartment 20 to the camera 140 may be doubly blocked by the first glass 170 and the second glass 180, and thus the temperature of the camera 140 may be efficiently prevented from being increased.

Figure 11:
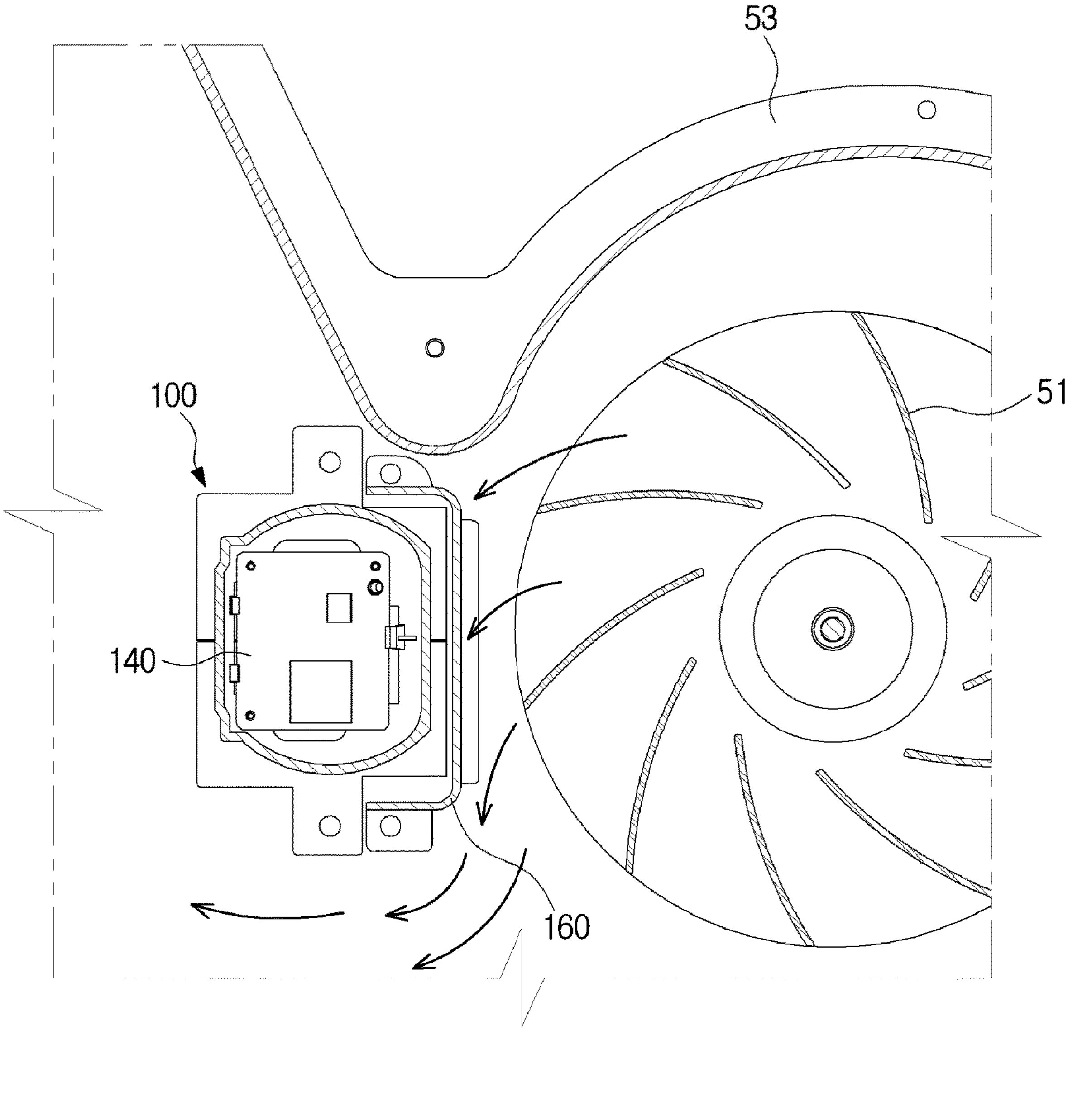
FIG. 11 is a view showing that air discharged to the outside through the exhaust duct in accordance with one embodiment of the present disclosure bypasses and doesn't come into contact with the camera and is discharged to the outside by the blocking member.

FIG. 10 is a view showing that a blocking member in accordance with one embodiment of the present disclosure is provided between the camera and a cooling fan of the electrical component chamber, and FIG. 11 is a view showing that air discharged to the outside through the exhaust duct in accordance with one embodiment of the present disclosure bypasses and doesn't come into contact with the camera and is discharged to the outside by the blocking member.

As shown in FIGS. 8, 10, and 11, a blocking member 160 for preventing air discharged to the outside through the exhaust duct 53 from coming into direct contact with the camera 140 is provided between the camera 140 positioned in the exhaust duct 53 and the electrical component chamber cooling fan 51.

The blocking member 160 includes a third coupler 161 coupled to the bottom surface 57 of the electrical component chamber 50 and a support 163 supporting the exhaust duct 53 to prevent sagging of the exhaust duct 53.

The blocking member coupling hole 59*b* is provided on the bottom surface 57 of the electrical component chamber 50 to which the blocking member 160 is coupled, and the blocking member 160 is coupled to the bottom surface 57 of the electrical component chamber 50 by the fastening member B inserted into the third coupler 161 and the blocking member coupling hole 59*b*.

When air suctioned from the outside by the electrical component chamber cooling fan 51 is discharged to the outside through the exhaust duct 53, the blocking member 160 coupled to the bottom surface 57 of the electrical component chamber 50 allows the air to be discharged without coming into contact with the camera 140 by blocking a part of the exhaust duct 53 between the camera 140 and the electrical component chamber cooling fan 51.

The air suctioned from the outside by the electrical component chamber cooling fan 51 cools the electrical components in the electrical component chamber 50 and is then discharged to the outside through the exhaust duct 53, and thus the air discharged to the outside through the exhaust duct 53 has a high temperature. When high temperature air comes into direct contact with the camera 140, the temperature of the camera 140 is increased, and thus the blocking member 160 is disposed between the camera 140 and the electrical component chamber cooling fan 51 to prevent the temperature of camera 140 from being increased.

Also, the support 163 supporting the exhaust duct 53 is provided at an upper portion of the blocking member 160 to prevent sagging of the exhaust duct 53.

A part of the camera module 100 is coupled to an upper portion of the exhaust duct 53, and thus a portion of the exhaust duct 53 to which the part of the camera module 100 is coupled may sag downward, and the support 163 of the blocking member 160 supports the exhaust duct 53 to prevent sagging of the exhaust duct 53.

Figure 12:
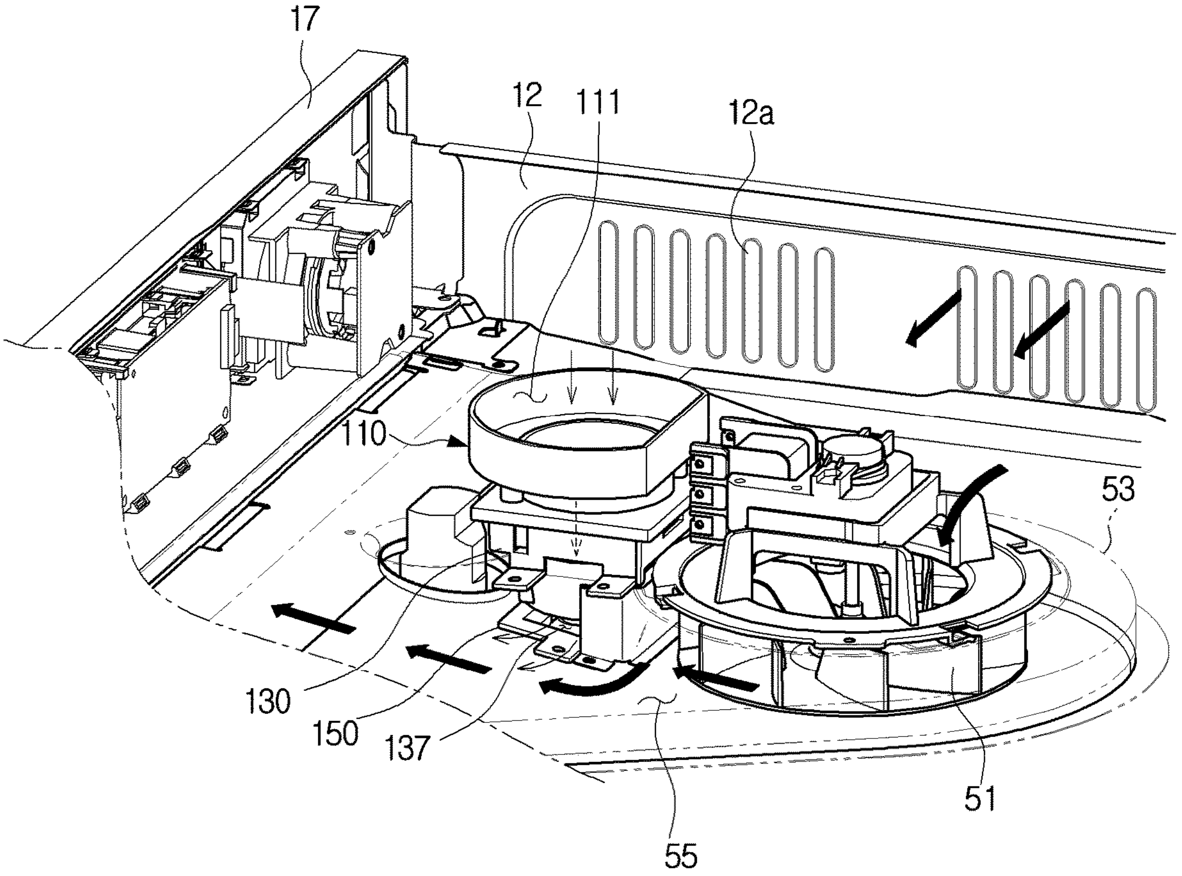
FIG. 12 is a view showing that air suctioned from the outside by a cooling fan of the camera and the cooling fan of the electrical component chamber in accordance with one embodiment of the present disclosure is discharged through the exhaust duct.

FIG. 12 is a view showing that air suctioned from the outside by a cooling fan of the camera and the cooling fan of the electrical component chamber in accordance with one embodiment of the present disclosure is discharged through the exhaust duct.

As shown in FIG. 12, the electrical component chamber cooling fan 51 suctions external air into the electrical component chamber 50 through the suction port 12*a* of the side panel 12.

After the air suctioned into the electrical component chamber 50 cools the electrical components in the electrical component chamber 50, the air is suctioned into the exhaust duct 53 by the electrical component chamber cooling fan 51, and the air suctioned into the exhaust duct 53 is guided by the exhaust passage 55 and is discharged to the outside.

The external air suctioned into the inlet 15 of the upper panel 14 by the camera cooling fan 120 is moved through the suction flow path 111, cools the camera 140, and is then discharged through the outlet 137.

Because the electrical component chamber cooling fan 51 cools the entirety of the electrical component chamber 50, the electrical component chamber cooling fan 51 requires more air flow than that of the camera cooling fan 120 cooling the camera 140, thereby having a larger size than the camera cooling fan 120.

Therefore, the air discharged by the electrical component chamber cooling fan 51 to the exhaust duct 53 has a higher speed than the air discharged by the camera cooling fan 120 to the outlet 137, and thus the air discharged into the outlet 137 is discharged to the outside along with the air discharged into the exhaust duct 53 by the electrical component chamber cooling fan 51.

Figure 13:
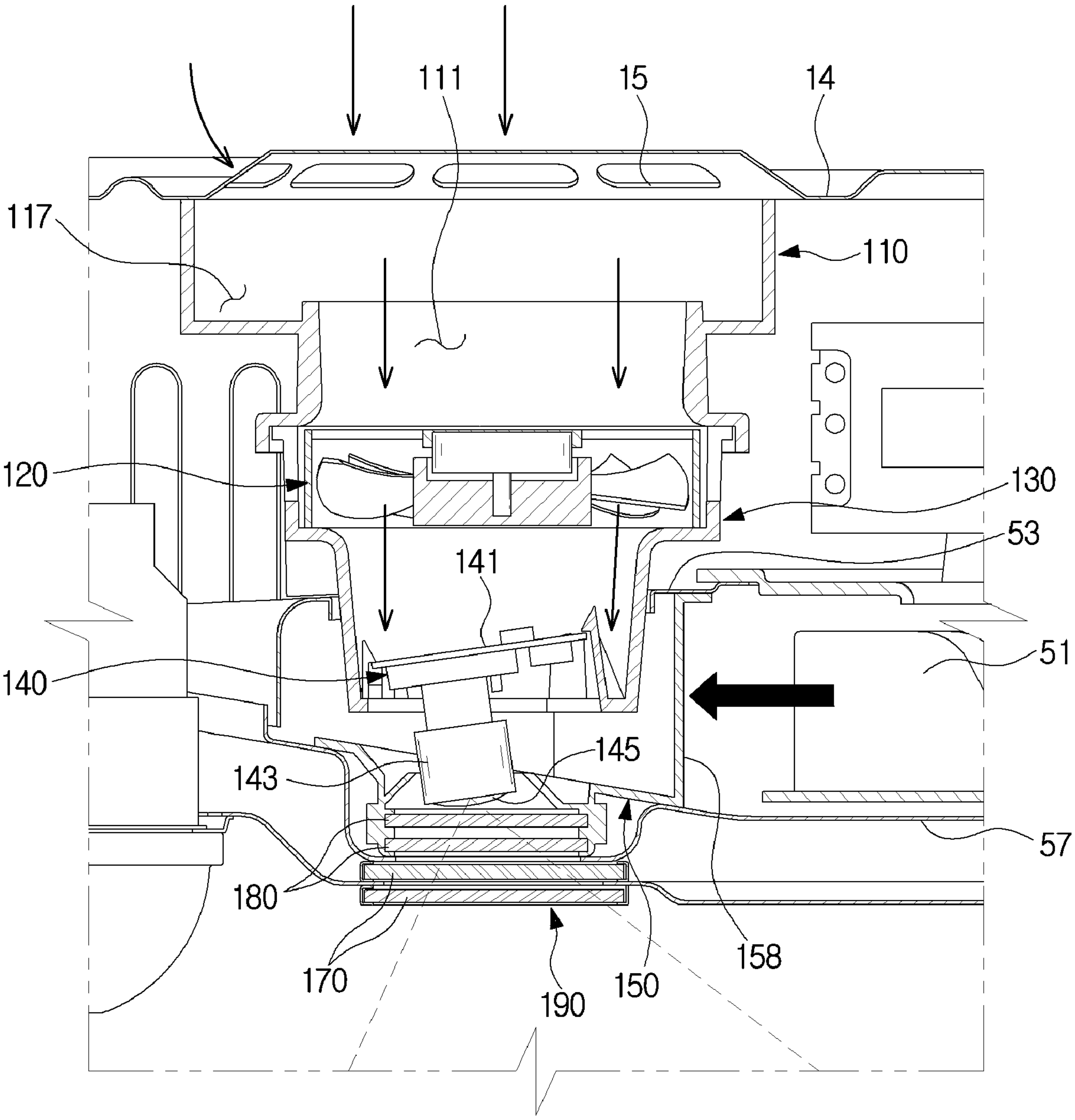
FIG. 13 is a view showing that a blocking member is integrally provided in the glass holder as another embodiment of the present disclosure.
Figure 14:
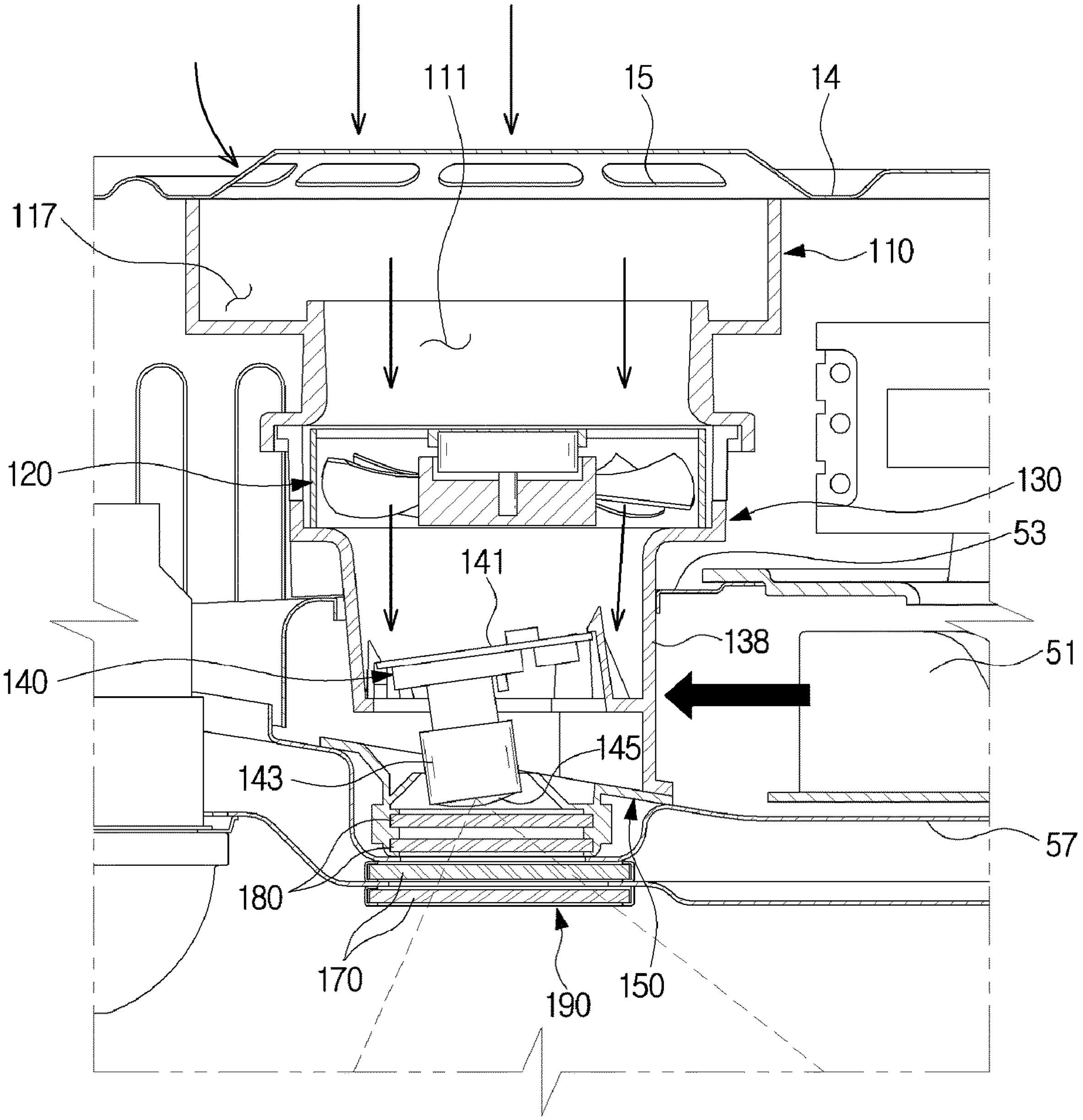
FIG. 14 is a view showing that a blocking member is integrally provided in the camera holder as another embodiment of the present disclosure.

FIG. 13 is a view showing that a blocking member is integrally provided in a glass holder as another embodiment of the present disclosure, and FIG. 14 is a view showing that a blocking member is integrally provided in the camera holder as another embodiment of the present disclosure.

As shown in FIG. 13, a blocking member 158 is not separately provided but is integrally provided in the glass holder 150 to prevent the air suctioned into the exhaust duct 53 by the electrical component chamber cooling fan 51 from coming into direct contact with the camera 140.

Also, as shown in FIG. 14, a blocking member 138 is not separately provided but is integrally provided in the camera holder 130 to prevent the air suctioned by the electrical component chamber cooling fan 51 and discharged into the exhaust duct 53 from being directly in contact with the camera 140.

Figure 15:
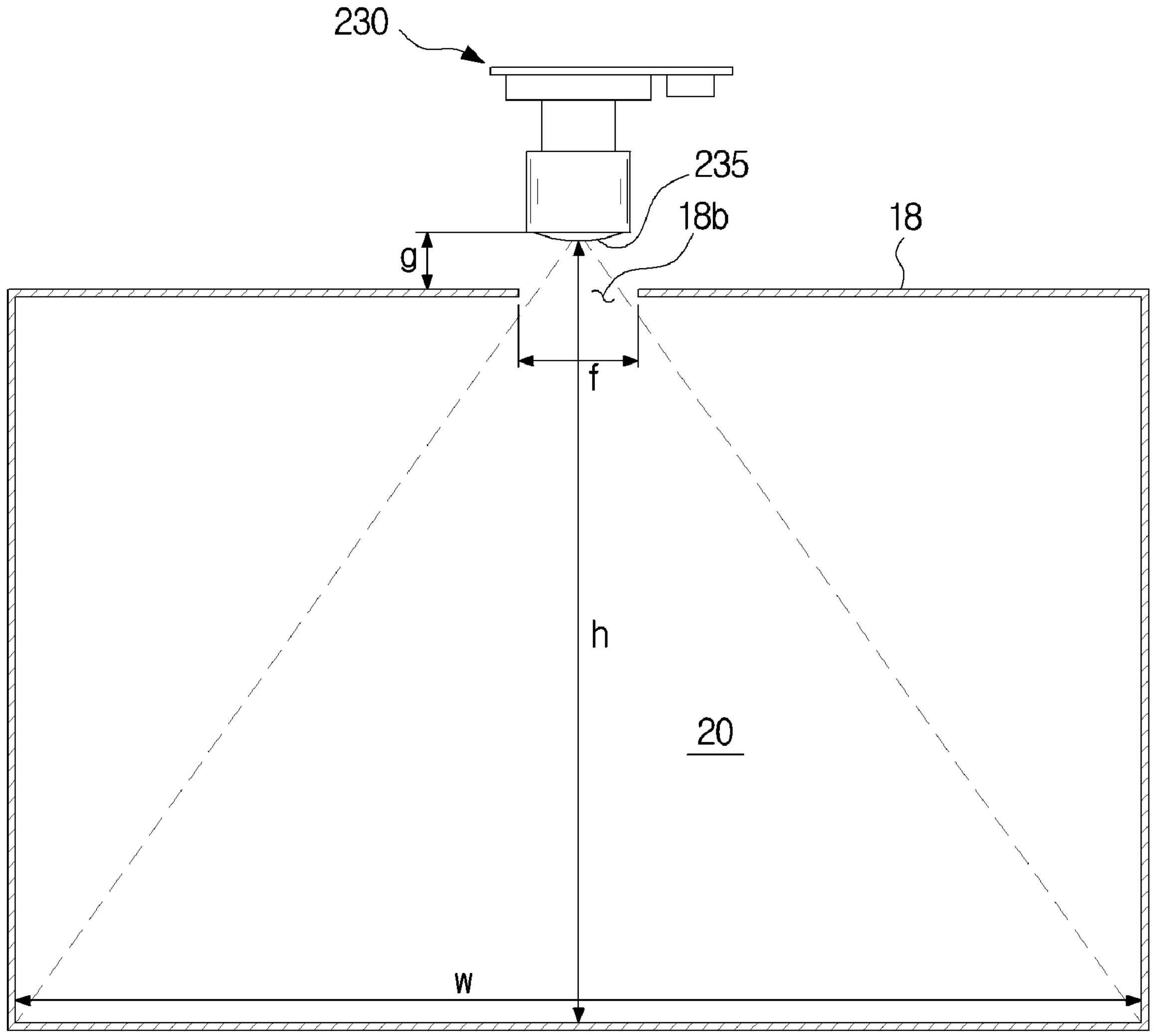
FIG. 15 is a schematic view of the oven in accordance with one embodiment of present disclosure.

FIG. 15 is a schematic view of the oven in accordance with one embodiment of present disclosure.

As shown in FIG. 15, the ceiling 18 of the cooking compartment 20 has the first opening 18*b* so that the camera 230 disposed above the ceiling 18 of the cooking compartment 20 captures the inside of the cooking compartment 20 through the first opening 18*b*.

The camera 230 is positioned above the ceiling 18 of the cooking compartment 20, and thus a width of the first opening 18*b* should be determined according to a distance between the ceiling 18 of the cooking compartment and a lens 235, a width of the cooking compartment 20, and a distance between the lens 235 and the bottom surface of the cooking compartment 20 such that a food to be cooked in the cooking compartment 20 may be captured via the camera 140.

When the width of first opening 18*b* is f, the distance between the ceiling 18 of the cooking compartment 20 and the lens 235 is g, the width of cooking compartment 20 is w, and the distance between the lens 235 and the bottom surface of the cooking compartment 20 is h, it is preferable for the width of the first opening 18*b* to satisfy the expression of "$f \geq g \times w/h$."

Figure 16:
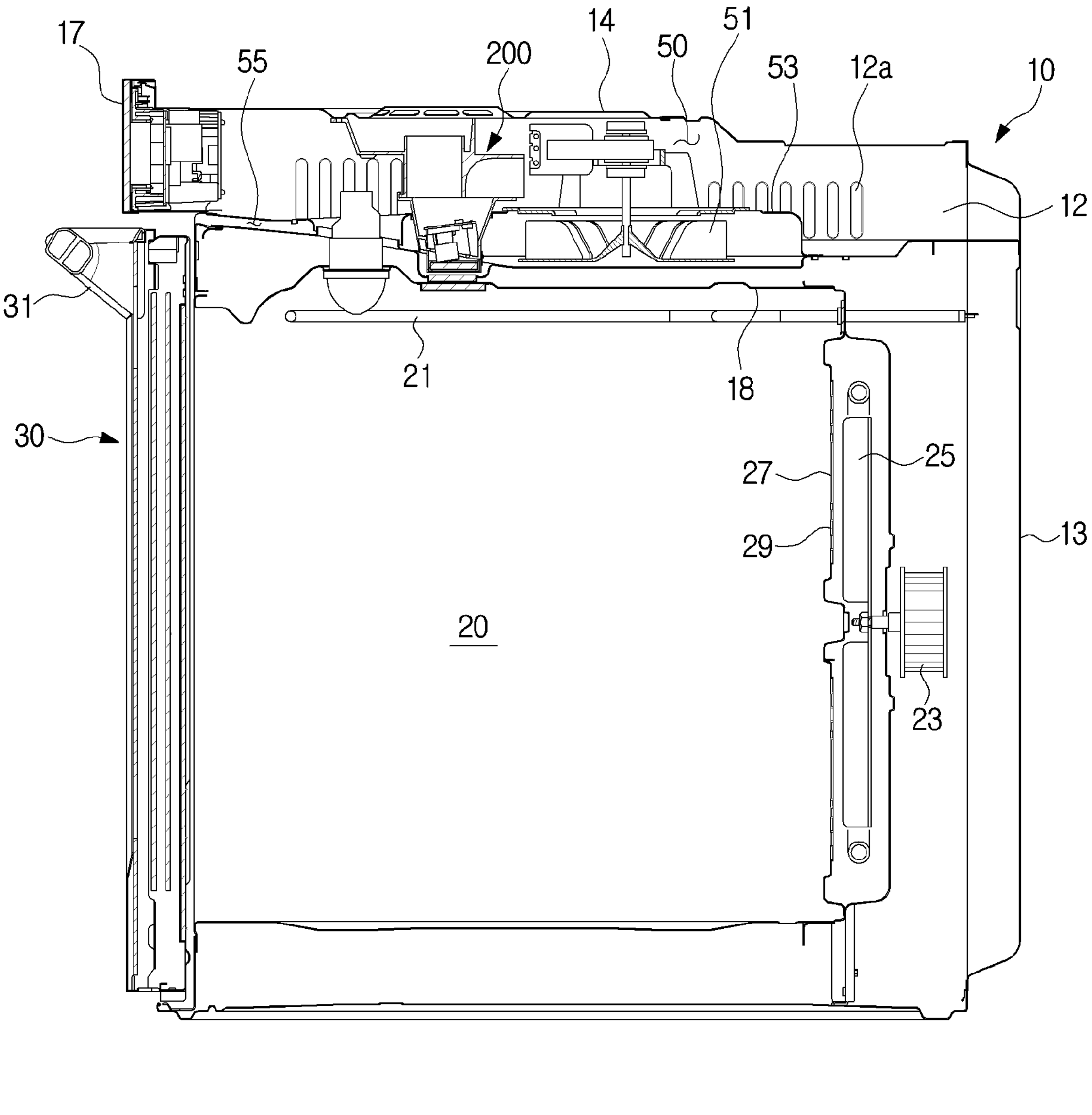
FIG. 16 is a lateral cross-sectional view of an oven in accordance with another embodiment of the present disclosure.
Figure 17:
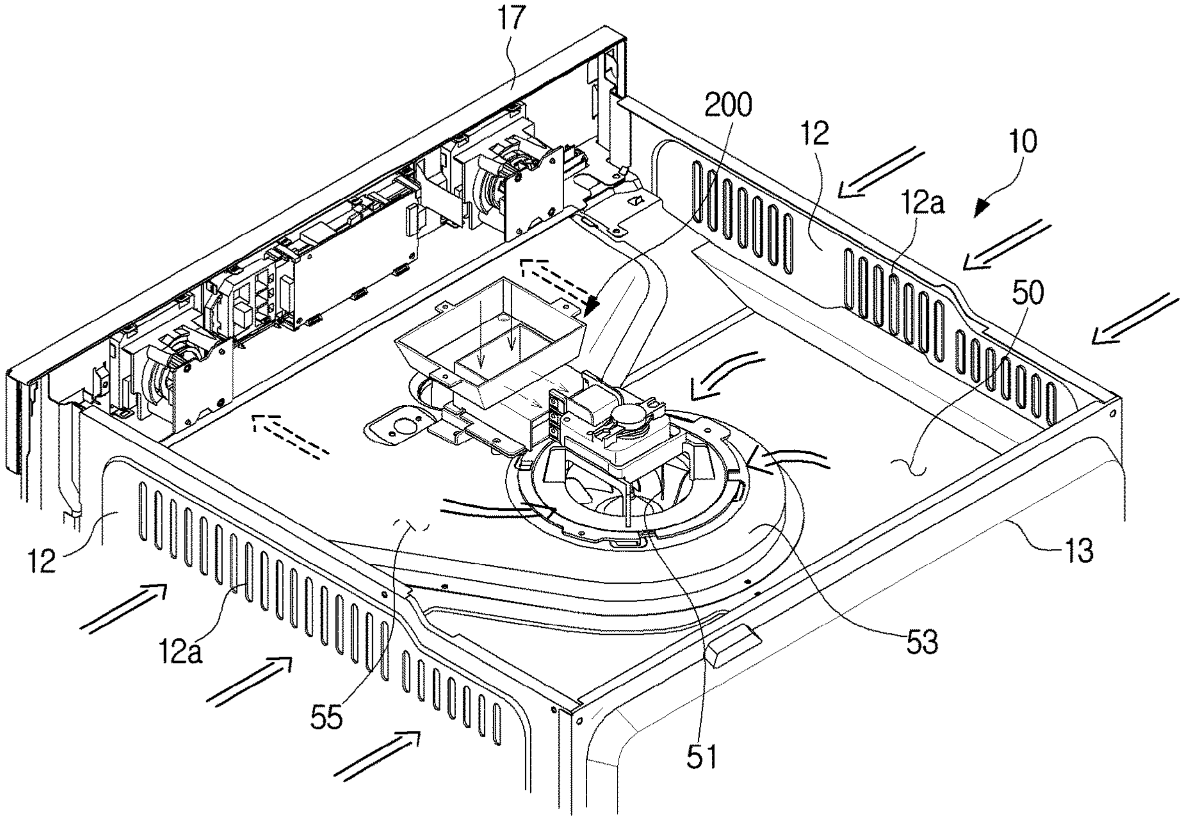
FIG. 17 is a view showing an inside of an electrical component chamber of the oven in accordance with another embodiment of the present disclosure.
Figure 18:
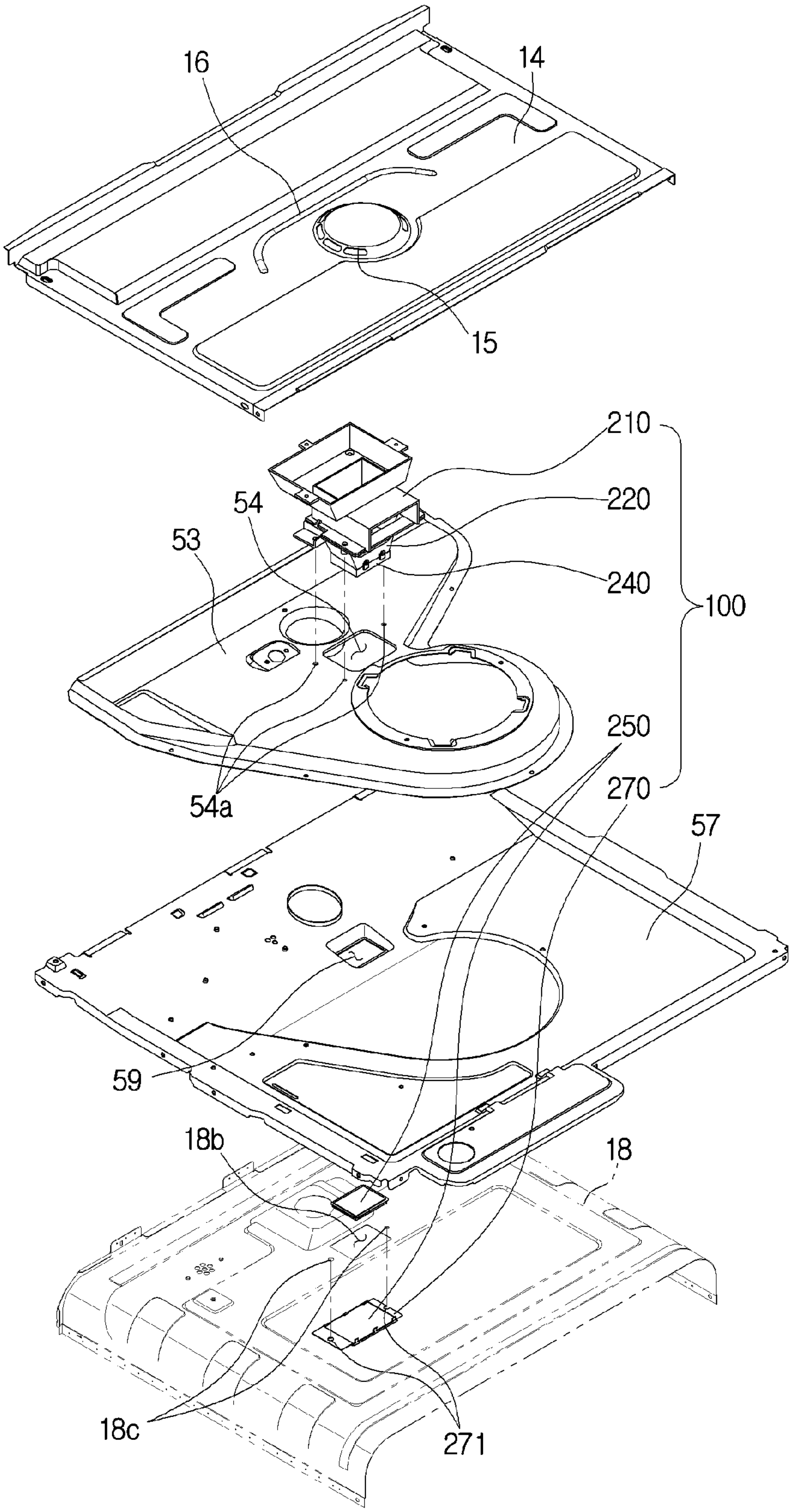
FIG. 18 is an exploded perspective view of a camera module in accordance with another embodiment of the present disclosure.
Figure 19:
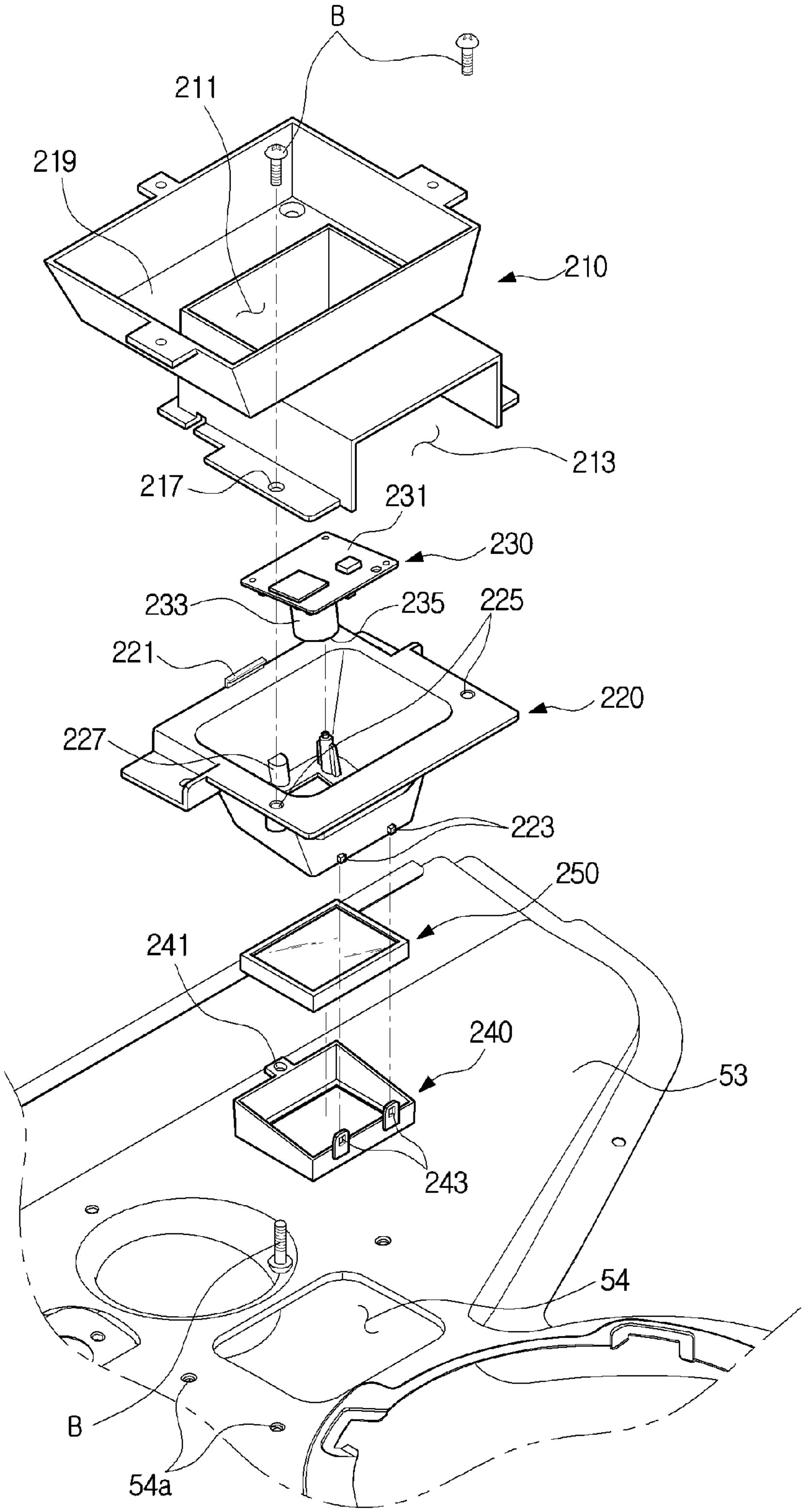
FIG. 19 is a view showing that a part of the camera module in accordance with another embodiment of the present disclosure is coupled to the exhaust duct.
Figure 20:
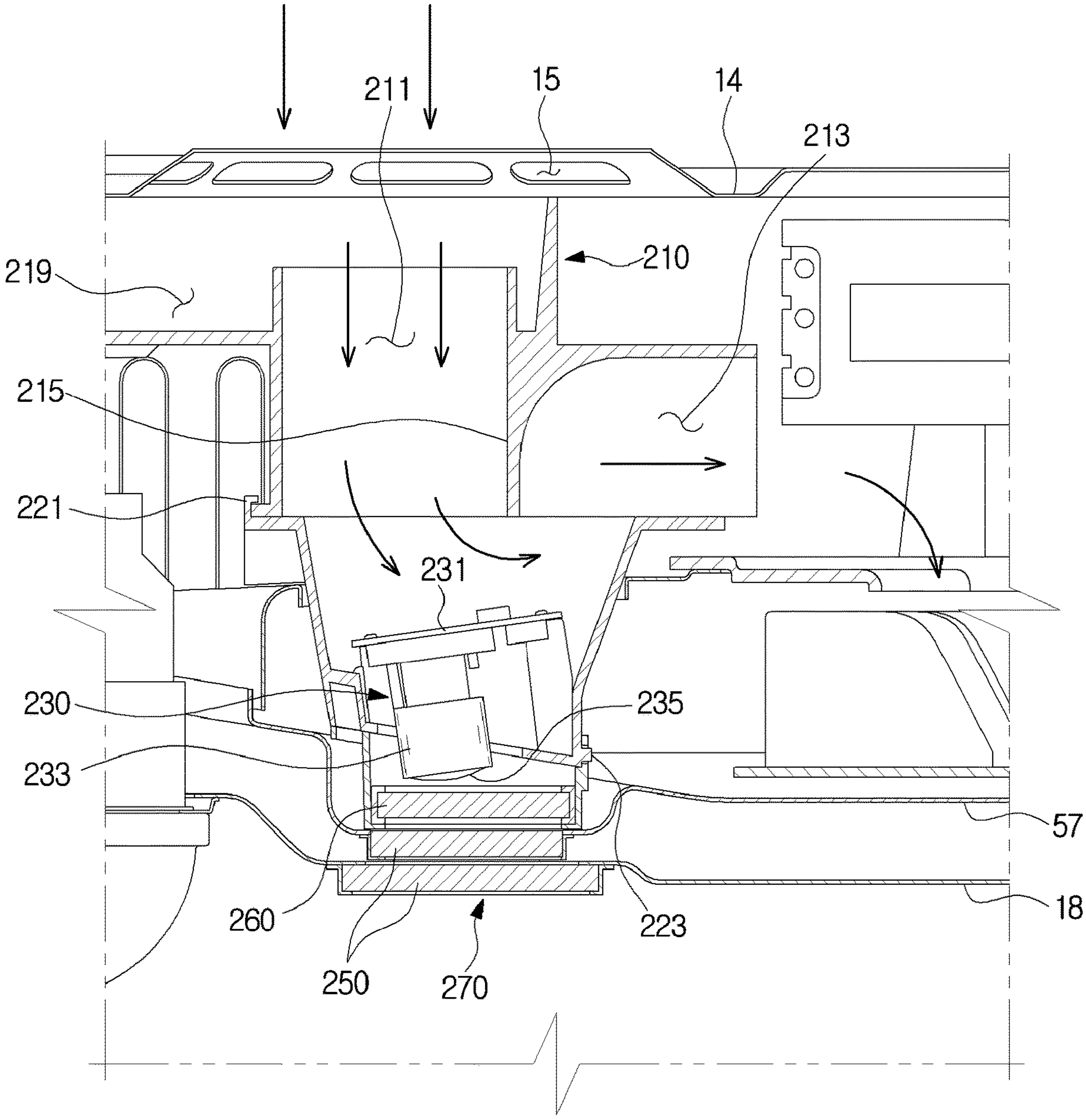
FIG. 20 is a view showing that the camera in accordance with another embodiment of the present disclosure is cooled by air suctioned from the outside by a cooling fan of the electrical component chamber.

FIG. 16 is a lateral cross-sectional view of an oven in accordance with another embodiment of the present disclosure, FIG. 17 is a view showing an inside of an electrical component chamber of the oven in accordance with another embodiment of the present disclosure, FIG. 18 is an exploded perspective view of a camera module in accordance with another embodiment of the present disclosure, FIG. 19 is a view showing that a part of the camera module in accordance with another embodiment of the present disclosure is coupled to an exhaust duct, and FIG. 20 is a view showing that the camera in accordance with another embodiment of the present disclosure is cooled by air suctioned from the outside by a cooling fan of the electrical component chamber.

As shown in FIGS. 16 to 20, a camera module 200 is provided at the top of the cooking compartment 20 to capture a food to be cooked in the cooking compartment 20.

The camera module 100 shown in FIGS. 2 to 14 includes the separate camera cooling fan 120 to cool the camera 140, but the camera module 200 does not have a separate camera cooling fan to cool a camera 230, and thus the camera 230 may be cooled by the electrical component chamber cooling fan 51 provided in the electrical component chamber 50 to cool the electrical components in the electrical component chamber 50.

The camera module 200 includes a suction duct 210 communicating with the inlet 15 provided at the upper panel 14 of the main body 10, a camera holder 220 on which the camera 230 is mounted, the camera 230 mounted in the camera holder 220 to capture the inside of the cooking compartment 20, and at least one glass among glasses 250 and 260 provided under the camera 230.

The suction duct 210 includes a suction flow path 211 provided in the electrical component chamber 50 and communicating with the inlet 15, an outlet 213 through which air suctioned into the suction flow path 211 is discharged, a partition wall 215 provided between the suction flow path 211 and the outlet 213, a camera holder coupling hole 217 coupled to the camera holder 220, and a water storage 219 storing water dropped through the inlet 15 to prevent transfer of the water to the camera 230 through the suction flow path 211.

The suction flow path 211 communicates with the inlet 15 and guides the external air suctioned through the inlet 15 to be introduced to the camera 230.

The outlet 213 discharges the air suctioned into the suction flow path 211 through the inlet 15 to cool the camera 230 to the outside of the camera module 200.

The outlet 213 is provided to face an electrical component chamber cooling fan suction port 52, and an upper end of the outlet 213 is provided to be higher than an upper end of the electrical component chamber cooling fan 51.

An upper end of the outlet 213 is provided to be higher than the upper end of the electrical component chamber cooling fan 51, and the outlet 213 is positioned at an upper portion of the electrical component chamber cooling fan suction port 52.

The outlet 213 is positioned at the upper portion of the electrical component chamber cooling fan suction port 52, and thus the external air is suctioned through the inlet 15 by a suction force of the electrical component chamber cooling fan 51 even though a separate camera cooling fan is not provided in the camera module 200.

The partition wall 215 is provided between the suction flow path 211 and the outlet 213, and thus the air suctioned into the suction flow path 211 is not discharged directly through the outlet 213.

The camera holder 220 on which the camera 230 is mounted is provided at a lower portion of the suction duct 210, and the suction duct 210 and the camera holder 220 are coupled by the fastening member B fastened to the camera holder coupling hole 217 provided in the suction duct 210 and a suction duct coupling hole 225 provided in the camera holder 220.

Each of the suction flow path 211 and the outlet 213 of the suction duct 210 is provided to communicate with the camera holder 220. Air suctioned into the suction flow path 211 is blocked from moving to the outlet 213 by the partition wall 215 and is transferred to the camera holder 220, and the air transferred to the camera holder 220 cools the camera 230.

The air that cooled camera 230 is discharged to the outside of the camera module 200 through the outlet 213, and the air discharged through the outlet 213 is suctioned into the electrical component chamber cooling fan suction port 52 and is then discharged to the outside of the electrical component chamber 50 through the exhaust duct 53.

The camera holder 220 includes a fixing hook 221 fixed to the suction duct 210, a fixing protrusion 223 fixed to a glass holder 240 provided under the camera holder 220, the suction duct coupling hole 225 coupled to the camera holder coupling hole 217 of the suction duct 210, and a glass holder coupling hole 227 coupled to the glass holder 240.

When the fixing hook 221 of the camera holder 220 is fixed to the suction duct 210, the fastening member B is fastened to the camera holder coupling hole 217 of the suction duct 210 and the suction duct coupling hole 225 of the camera holder 220, and thus the camera holder 220 is coupled to the suction duct 210.

The camera 230 is mounted on the camera holder 220, and the camera 230 is disposed in the electrical component chamber 50, and thus a temperature of the camera 230 may be increased by the heat generated by the electrical component in the electrical component chamber 50. The electrical component chamber 50 in which the camera 230 is disposed is provided above the cooking compartment 20, and thus the temperature of the electrical component chamber 50 may be increased by the heat generated by the cooking compartment 20.

When the temperature of the camera 230 increases, a fault may occur in the camera 230 and an image quality thereof may be degraded, and thus it is necessary to cool the camera 230. In this case, the camera 230 is cooled by the external air suctioned into the inlet 15 by the electrical component chamber cooling fan 51.

The camera 230 includes a mounting part 231 mounted on the camera holder 220, a body tube 233 extending downward from the mounting part 231 and having a cylindrical shape, and a lens 235 disposed at an end of the body tube 233 to capture the inside of the cooking compartment 20.

The lens 235 is positioned at the lower portion of the camera holder 220, and thus the lens 235 may be inserted into the second opening 54 along with the lower portion of the camera holder 220.

The lens 235 inserted into the second opening 54 is inserted into the third opening 59 provided on the bottom surface 57 of the electrical component chamber 50 and is positioned near the ceiling of the cooking compartment 20 to capture the inside of the cooking compartment 20.

At least one glass among the glasses 250 and 260 is provided under the camera 230 to allow the camera 230 to capture the inside of the cooking compartment 20 and block transmission of the heat in the cooking compartment 20 to the camera 230.

The glasses 250 and 260 include two first glasses 250 fixed to a glass bracket 270 to be disposed at an upper surface and a lower surface of the ceiling 18 and one second glass 260 fixed to the glass holder 240 to be disposed between the camera 230 and the first glass 250.

The drawings show the glasses 250 and 260 including the two first glasses 250 and the one second glass 260, but the numbers of glasses is not limited thereto. One or at least three first glasses 250 may be provided, and at least two second glasses 260 may be provided.

Also, the glasses 250 and 260 may be provided as a single glass without being divided into the first glass 250 and the second glass 260.

When the glasses 250 and 260 are provided as a single glass, it is preferable for the glasses 250 and 260 to have a thickness of 4 mm or more.

When the glasses 250 and 260 are divided into the first glass 250 and the second glass 260, it is preferable for the sum of thicknesses of the first glass 250 and the second glass 260 to be 4 mm or more.

When the thickness of the glasses 250 and 260 is 4 mm or less, a heat reflection coating layer 255 is provided on one surface of the glasses 250 and 260, as shown in FIG. 6, or the heat reflection coating layers 255 may be provided on both surfaces of the glasses 250 and 260, as shown in FIG. 7.

When the heat reflection coating layer 255 is provided on one surface of the glasses 250 and 260, it is preferable for the surface on which the heat reflection coating layer 255 to be provided to face the cooking compartment 20.

Also, the glasses 250 and 260 may be formed of a tempered glass which is resistant to heat or a borosilicate glass to prevent damage caused by heat, and when the plurality of glasses 250 and 260 are provided, only a glass 250 disposed closest to the cooking compartment 20 may be formed of the tempered glass or the borosilicate glass.

One second glass 260 is fixed to the glass holder 240, and the glass holder 240 includes a camera holder coupling hole 241 coupled to the camera holder 220 positioned at an upper portion of the glass holder 240, and a fixing hole 243 to which the fixing protrusion 223 of the camera holder 220 is fixed.

After the fixing protrusion 223 of the camera holder 220 is fixed to the fixing hole 243 of the glass holder 240, the fastening member B is fastened to the camera holder coupling hole 241 of the glass holder 240 and the glass holder coupling hole 227 of the camera holder 220, and the glass holder 240 is coupled to the lower portion of the camera holder 220.

A space in which an end of the body tube 233 of the camera 230 at which the lens 235 is disposed is positioned is sealed by the mounting part 231 of the camera 230 and the glass holder 240 to prevent a foreign material, such as dust, from entering the lens 235.

The first opening 18*b* is provided on the ceiling 18 of the cooking compartment, the second opening 54 is provided in the exhaust duct 53, and the third opening 59 is provided on the bottom surface 57 of the electrical component chamber 50. A configuration in which the camera 230 captures the inside of the cooking compartment 20 through the openings 18*b*, 54, and 59 is the same as the configuration shown in FIGS. 2 to 14, and thus a description thereof will be omitted.

However, in the case of the camera module 100 shown in FIG. 4, the coupling holes 59*a* and 59*b* to which the blocking member 160 and the glass holder 150 are coupled are provided around the third opening 59. In the case of the camera module 200 shown in FIG. 18, the glass holder 240 is coupled to the camera holder 220, and the blocking member is not applied, and thus it is not necessary for a coupling hole to be provided around the third opening 59.

The glass bracket 270 to which the first glass 250 is fixed includes a coupler 271 provided at a position corresponding to the glass bracket coupling hole 18*c*, and the glass bracket 270 is coupled to the ceiling 18 of the cooking compartment 20 by the fastening member B inserted into the coupler 271 and the glass bracket coupling hole 18*c*.

The glass bracket 270 is attachable to and detachable from the ceiling 18 of the cooking compartment 20, and thus, when a foreign material is on the first glass 250 positioned above the cooking compartment 20, the glass bracket 270 may be separated from the ceiling 18 of the cooking compartment 20 and the foreign material may be removed from the first glass 250.

A flow of air cooling the camera 230 of the camera module 200 will be described with reference to FIGS. 17 and 20.

As shown in FIGS. 17 and 20, the external air is suctioned into the inlet 15 formed in the upper panel 14 of the main body and suction ports 12*a* formed in both side panels 12 of the main body 10 by the electrical component chamber cooling fan 51.

The air suctioned into the suction ports 12*a* cools the inside of the electrical component chamber 50, is suctioned through the electrical component chamber cooling fan suction port 52, and is then discharged to the outside of the electrical component chamber 50 through the exhaust duct 53.

The air suctioned into the inlet 15 is transferred to the camera holder 220 through the suction flow path 211 to cool the camera 230, and is then discharged through the outlet 213, and the air discharged to the outlet 213 is suctioned through the electrical component chamber cooling fan suction port 52 and is discharged to the outside of the electrical component chamber 50 through the exhaust duct 53.

While not shown in the drawings, when the space in which the camera 230 is positioned is in a vacuum due to a vacuum insulating material being foamed around the camera 230, heat is not transmitted to the camera 230, and thus a configuration for cooling the camera 230 may be omitted.

According to embodiments of the present disclosure, a camera is disposed above a cooking compartment such that an inside of the cooking compartment may be clearly captured, and a temperature of the camera disposed above the cooking compartment may be prevented from being increased.

Although particular shapes and directions have been mainly described in the above description of the oven with reference to the accompanying drawings, various modifications and changes may be made by those skilled in the art, and it should be recognized that such modifications and changes pertain to the scope of the present disclosure.

What is claimed is:

1. An oven comprising:

a main body;

an electrical component chamber inside the main body;

a cooking compartment inside the main body and separated from the electrical component chamber, the cooking compartment having an opening in a ceiling of the cooking compartment;

a camera assembly positioned above the cooking compartment, and including a body tube extending downward and tilted toward a rear of the cooking compartment, and a lens positioned at a bottom end of the body tube and configured to face the opening;

a first glass positioned at the opening to reduce transmission of heat from the cooking compartment through the opening;

a second glass positioned between the first glass and the lens to reduce transmission, to the camera assembly, of the heat from the cooking compartment transmitted through the opening and the first glass;

a holder configured to hold the second glass and at least part of the camera assembly;

a first fan configured to suction air from outside of the main body, wherein a flow path is formed inside the main body to guide the air suctioned by the first fan to the camera assembly;

a second fan configured to discharge air inside the electrical component chamber to outside of the main body; and a third fan configured to circulate air inside the cooking compartment;

wherein the first glass and the second glass are positioned so that an image inside of the cooking compartment is capturable by the camera assembly through the first glass and the second glass.

2. The oven according to claim 1, wherein the body tube is tilted so that the lens is directed toward a bottom of the rear of the cooking compartment.

3. The oven according to claim 1, wherein the camera assembly is above a front portion of the ceiling of the cooking compartment.

4. The oven according to claim 1, wherein the main body includes a front panel having an opening, and the oven further comprises a door configured to open and close the opening of the front panel.

5. The oven according to claim 1, wherein at least part of the camera assembly is in the electrical component chamber.

6. The oven according to claim 5, further comprising at least one electrical component in the electrical component chamber.

7. The oven according to claim 5, wherein the electrical component chamber includes an opening at a bottom surface of the electrical component chamber, and the lens is exposed through the opening of the electrical component chamber.

8. The oven according to claim 7, wherein the opening of the electrical component chamber is positioned with respect to the opening of the cooking compartment so that, with the lens being exposed through the opening of the electrical component chamber, the image inside of the cooking compartment is capturable by the camera assembly through the first glass and the second glass.

9. The oven according to claim 1, further comprising:

a gasket on the holder having an insertion hole into which the bottom end of the body tube is inserted so that the gasket seals a space in the holder in which the lens is disposed.

10. An oven comprising:

a main body;

an electrical component chamber inside the main body;

a cooking compartment inside the main body and separated from the electrical component chamber, the cooking compartment having an opening in a ceiling of the cooking compartment;

a heater positioned at the ceiling of the cooking compartment and configured to heat an object in the cooking compartment;

a first fan configured to suction air from outside of the main body;

a camera assembly positioned above the cooking compartment, and including a body tube extending downward and tilted toward a rear of the cooking compartment, and a lens positioned at a bottom end of the body tube and configured to face the opening;

a first glass positioned at the opening to reduce transmission of heat from the cooking compartment through the opening;

a second glass positioned between the first glass and the lens to reduce transmission, to the camera assembly, of the heat from the cooking compartment transmitted through the opening and the first glass;

a holder configured to hold the second glass and at least part of the camera assembly, and forming at least a portion of a flow path along which the air suctioned by the first fan flows to the camera assembly to cool the camera assembly, the holder including an outlet positioned so that the air that cooled the camera assembly is discharged to the electrical component chamber through the outlet; and a second fan positioned outside the cooking compartment and configured to discharge, to outside of the main body, the air discharged to the electrical component chamber through the outlet, wherein the first glass and the second glass are positioned so that an image inside of the cooking compartment is capturable by the camera assembly through the first glass and the second glass.

11. The oven according to claim 10, wherein the holder is configured to prevent the air discharged by the second fan from directly contacting the camera assembly.

12. The oven according to claim 10, wherein the holder includes a gasket having an insertion hole into which the bottom end of the body tube is inserted so that a space in the holder in which the lens is disposed is sealed.

13. The oven according to claim 10, wherein at least part of the camera assembly is in the electrical component chamber.

14. The oven according to claim 10, further comprising at least one electrical component in the electrical component chamber.

15. An oven comprising:

a main body;

an electrical component chamber inside the main body;

a cooking compartment inside the main body and separated from the electrical component chamber, the cooking compartment having an opening in a ceiling of the cooking compartment;

a camera assembly positioned above the cooking compartment, and including a body tube extending downward and tilted toward a rear of the cooking compartment, and a lens positioned at a bottom end of the body tube and configured to face the opening;

a first glass positioned at the opening to reduce transmission of heat from the cooking compartment through the opening;

a second glass positioned between the first glass and the lens to reduce transmission, to the camera assembly, of the heat from the cooking compartment transmitted through the opening and the first glass;

a holder configured to hold the second glass and at least part of the camera assembly, and including an outlet;

a first fan configured to suction air from outside of the main body, wherein a flow path is formed inside the main body to guide the air suctioned by the first fan to the camera assembly so that the air suctioned by the first fan cools the camera assembly, and the outlet is positioned so that the air that cooled the camera assembly is discharged into the electrical component chamber through the outlet; and a second fan positioned outside the cooking compartment and configured to discharge, to outside of the main body, the air discharged into the electrical component chamber through the outlet.

16. The oven according to claim 15, wherein the first glass and the second glass are positioned so that an image inside of the cooking compartment is capturable by the camera assembly through the first glass and the second glass.

17. The oven according to claim 15, further comprising:

a gasket on the holder having an insertion hole into which the bottom end of the body tube is inserted so that the gasket seals a space in the holder in which the lens is disposed.

18. The oven according to claim 15, further comprising:
a heater configured to, when an object is to be cooked in the cooking compartment, heat the object.

19. The oven according to claim 15, wherein the holder is configured to prevent the air discharged by the second fan from directly contacting the camera assembly.

20. The oven according to claim 15, wherein at least part of the camera assembly is in the electrical component chamber.

* * * * *